(12) United States Patent
Hong et al.

(10) Patent No.: US 12,461,839 B1
(45) Date of Patent: Nov. 4, 2025

(54) DATABASE INSTANCE CLUSTERING

(71) Applicant: SAP SE, Walldorf (DE)

(72) Inventors: Jingun Hong, Seoul (KR); Dong Won Hwang, Seoul (KR); Sumi Yun, Seoul (KR); Won Joon Lee, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/652,597

(22) Filed: May 1, 2024

(51) Int. Cl.
  *G06F 16/24* (2019.01)
  *G06F 11/14* (2006.01)
  *G06F 11/34* (2006.01)
  *G06F 16/21* (2019.01)
  *G06F 16/2453* (2019.01)
  *G06F 16/25* (2019.01)

(52) U.S. Cl.
  CPC ...... *G06F 11/3414* (2013.01); *G06F 11/1469* (2013.01); *G06F 16/219* (2019.01); *G06F 16/24542* (2019.01); *G06F 16/256* (2019.01)

(58) Field of Classification Search
  None
  See application file for complete search history.

(56) References Cited

U.S. PATENT DOCUMENTS

| | | | |
|---|---|---|---|
| 9,529,846 B2* | 12/2016 | Wu | G06F 16/2471 |
| 9,804,666 B2* | 10/2017 | Jiao | G06T 1/60 |
| 10,043,232 B1* | 8/2018 | Ramadoss | G06F 9/3887 |
| 10,409,319 B2* | 9/2019 | Rajwani | G06F 13/1673 |
| 10,409,571 B1* | 9/2019 | Targowski | G06F 9/522 |
| 10,528,118 B2* | 1/2020 | Vembu | G06F 13/4022 |
| 11,722,573 B2* | 8/2023 | Shukla | G06F 9/4856 709/223 |
| 11,848,847 B1* | 12/2023 | Guo | H04L 67/10015 |
| 2002/0129146 A1* | 9/2002 | Aronoff | H04L 67/1034 709/225 |
| 2017/0132042 A1* | 5/2017 | Cherkasova | G06F 9/5077 |
| 2019/0294596 A1* | 9/2019 | Yan | G06F 11/0712 |
| 2019/0386889 A1* | 12/2019 | Noorshams | H04L 47/83 |
| 2021/0096981 A1* | 4/2021 | Desikachari | G06F 9/466 |
| 2021/0133186 A1* | 5/2021 | Jalali | G06F 21/6218 |
| 2022/0292112 A1* | 9/2022 | Tian | G06F 16/285 |
| 2023/0325256 A1* | 10/2023 | Sun | G06F 9/5088 718/1 |

* cited by examiner

*Primary Examiner* — Eliyah S. Harper
(74) *Attorney, Agent, or Firm* — Klarquist Sparkman, LLP

(57) ABSTRACT

Database instances can be clustered using various attributes, such as attributes reflecting resources assigned to a database instance, attributes reflecting configuration or software version information, or attributes that reflect users or usage of a database instance. As it can be resource intensive to capture database workloads, one or more database instances can be selected from one or more of the clusters and workloads can be captured from such instances. In a similar manner, various attributes can be used to cluster database instances, and one or more instances can be selected from one or more of the clusters, and a captured workload can be replayed on such instances.

20 Claims, 14 Drawing Sheets

DATABASE INSTANCE CLUSTERING

The present disclosure relates to clustering database instances based on various attributes. Particular implementations relate to clustering database instances and selecting one or more representative instances from one or more clusters to be used in database workload capture or replay operations.

BACKGROUND

It is typically desirable to optimize or test the performance of a database system, including prior to releasing a new version of database software or changing configuration settings. Changing operational parameters of the database system, or changing to a new version of software implementing the database system, can, in some cases, have a negative effect on the processing speed or resource use of the database system. Before changing database system parameters or software, it can be useful to evaluate the performance of a test database system, such as to compare its performance with a current production database system or other reference.

Typically, a simulated or emulated workload is run on the test system. However, the simulated or emulated workload may not accurately reflect the workload experienced by a production database system. Accordingly, results from the test system may not accurately reflect the performance of the production database system under the changed parameters or software.

To address these problems, database capture and replay systems have been developed, where a workload on one database system is captured and replayed on another database system. The results from the two executions can be compared to confirm that the replay system produced results that would be expected given results obtained at the capture system. Similarly, performance metrics can be recorded at the capture system and the replay system to be compared. If results or performance of the replay system are not as expected, software or configurations can be adjusted, or other action taken.

Although database capture and replay systems can indeed provide for improved testing, they can also be extremely resource intensive. This can be problematic, particularly when there are many database instances to be tested, or from which workloads may be captured. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for improving database workload capture/replay processes. Database instances can be clustered using various attributes, such as attributes reflecting resources assigned to a database instance, attributes reflecting configuration or software version information, or attributes that reflect users or usage of a database instance. As it can be resource intensive to capture database workloads, one or more database instances can be selected from one or more of the clusters and workloads can be captured from such instances. In a similar manner, various attributes can be used to cluster database instances, and one or more instances can be selected from one or more of the clusters, and a captured workload can be replayed on such instances.

In one aspect, the present disclosure provides a process of clustering database instances and selecting a database instance from a cluster produced thereby for database workload capture. For a plurality of database instances, respective sets of attribute values are received for a set of attributes describing database instances of the plurality of database instances. The plurality of database instances are clustered into a plurality of clusters using the respective sets of attribute values. At least one representative database instance is selected from at least one cluster of the plurality of clusters. A workload executed on the at least one representative database instance is captured to provide a captured workload.

In another aspect, the present disclosure provides a process of clustering database instances and selecting a database instance from a cluster produced thereby for database workload replay. For a plurality of database instances, respective sets of attribute values are received for a set of attributes describing database instances of the plurality of database instances. The plurality of database instances are clustered into a plurality of clusters using the respective sets of attribute values. At least one representative database instance is selected from at least one cluster of the plurality of clusters. A captured workload is replayed on the at least one representative database instance.

The present disclosure also includes computing systems and tangible, non-transitory computer readable storage media configure to carry out, or including instructions for carrying out, an above-described method. As described herein, a variety of other features and advantages can be incorporated into the technologies as desired.

DETAILED DESCRIPTION

Example 6)—Overview

Figure 1:
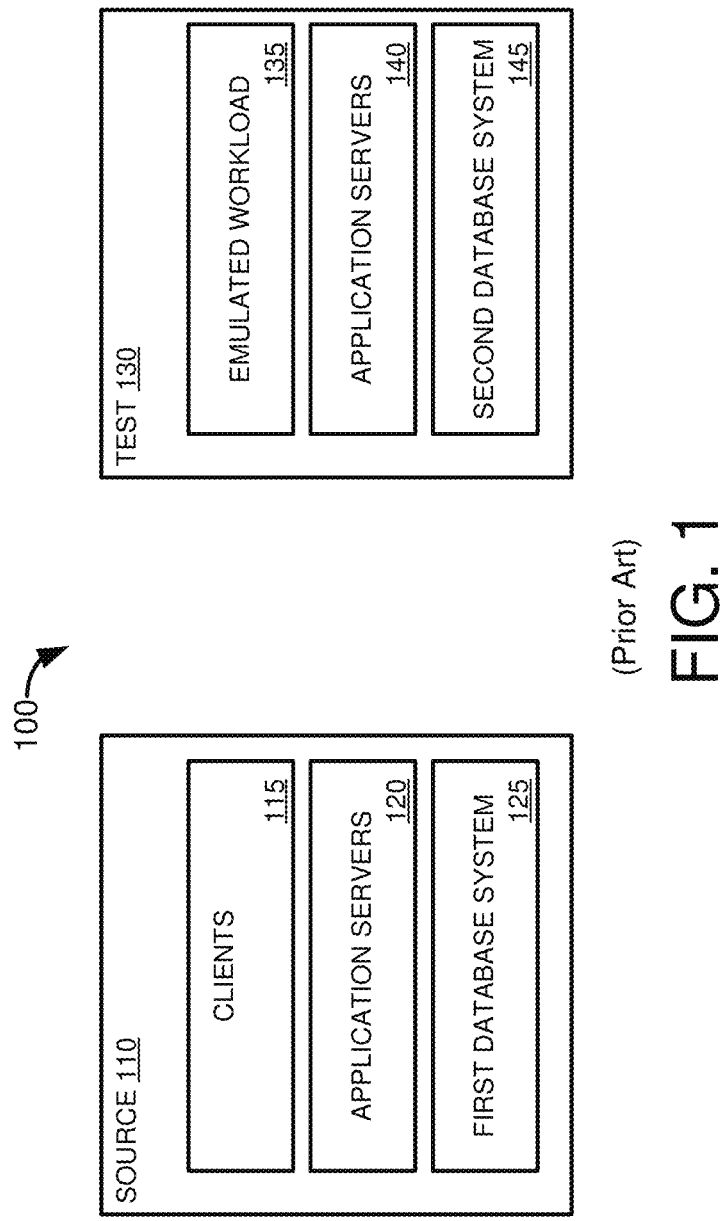
FIG. 1) is a diagram depicting a first database environment having a first database system and a second database environment having a second database system executing an emulated workload of the first database system.

It is typically desirable to optimize or test the performance of a database system, including prior to releasing a new version of database software or changing configuration settings. Changing operational parameters of the database system, or changing to a new version of software implementing the database system, can, in some cases, have a negative effect on the processing speed or resource use of the database system. Before changing database system parameters or software, it can be useful to evaluate the performance of a test database system, such as to compare its performance with a current production database system or other reference.

Typically, a simulated or emulated workload is run on the test system. However, the simulated or emulated workload may not accurately reflect the workload experienced by a production database system. Accordingly, results from the test system may not accurately reflect the performance of the production database system under the changed parameters or software.

To address these problems, database capture and replay systems have been developed, where a workload on one database system is captured and replayed on another database system. The results from the two executions can be compared to confirm that the replay system produced results that would be expected given results obtained at the capture system. Similarly, performance metrics can be recorded at the capture system and the replay system to be compared. If results or performance of the replay system are not as expected, software or configurations can be adjusted, or other action taken.

Although database capture and replay systems can indeed provide for improved testing, they can also be extremely resource intensive. This can be problematic, particularly when there are many database instances to be tested, or from which workloads may be captured. Accordingly, room for improvement exists.

In order to thoroughly test a database system, typically a large number of operations, such as SQL statements, are captured. The number of operations can be millions or even billions of statements. This can require the use of significant resources, both during workload capture, processing of capture data, and replay of the workload. For example, workload capture requires additional processing, memory, and storage overhead in capturing and storing statements, as well as other information associated with those statements or general database information, such as session information. The resources can consume terabytes of disk space, as well as terabytes of memory, particularly when testing is performed for an in-memory database. Significant processing resources are also used when a workload is replayed, particularly in terms of memory and processor use.

While the computing resources used for capture and replay using a single source and target system can be very high, the resource use typically increases linearly with the number of capture, replay, or capture and replay systems used. It is common to have multiple database instances running on a particular set of hardware. These use cases can include having multiple database instances running on a set of "on premise" hardware. However, the use of cloud computing has increased, and the number of database instances supported in cloud environments can greatly exceed those in more traditional use cases.

Disclosed techniques address these issues by "sampling" database instances, for capture or replay, and the using that information to adjust software or configurations. In particular, disclosed techniques cluster database systems based on a variety of features or characteristics. One or more representatives can be selected from a cluster and have their workload captures, rather than testing all database instances. Similarly, rather than testing all instances in a cluster using a captured workload, the capture workload can be replayed on one or more representative database instances. Since database instances in a cluster would typically be expected to behave similarly, identifying and addressing issues for the representative instances may address the issue of other database instances in the cluster.

Examples 2 and 3 describe techniques for comparing database performance, including components of a database and a particular example of how workload information can be captured. Examples 4-8 describe disclosed techniques for clustering database interfaces and for performing workload capture and replay for representative instances from the clusters.

Example 7)—Overview of Techniques for Comparing Database System Operation and Performance It is often of interest to optimize the processing of database operations. Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers. Because OLAP processes can involve complex analysis of a large number of records, they can require significant processing time.

Timely processing of OLTP workloads is important, as they can directly affect business operation and performance. However, timely processing of OLAP workloads is also important, as even relatively small improvements can result in significant time savings.

The programs responsible for implementing a database system are typically periodically updated. In addition, users, such as database administrators, may wish to change various database parameters in order to determine whether such changes may improve database performance.

Migrating a database system to a new program version, or seeking to optimize database operational parameters, can be problematic. For example, for a production (currently in operational use) database system, parameter or software version changes may negatively affect the usability, stability, or speed of the database system. Users may seek to create a test database system in order to evaluate the performance impact of using a new program version, or changing the parameters of a new or existing program version, in order to avoid negative impacts on a production database system.

In at least some embodiments, a workload refers to an amount of work, such as work involving data transfer or processing at a database system, over time, as well as the particular tasks performed as part of the work. The workload can include requests for database operations received by the database system from database clients. The workload can also include internal database operations, such as transferring or copying information in memory to persistent storage, the generation of temporary tables or other data (including data or metadata associated with a request for a database operation), and incorporating of temporary or other data into primary data sources.

FIG. 1 illustrates a database environment 100 having a first, source database environment 110 that includes one or more clients 115, one or more applications servers 120 available to service requests for database operations from the clients, and a first database system 125 on which the database operations are carried out. The database environment 100 also includes a second, test database environment 130 having an emulated workload 135, such as a workload that seeks to replicate a workload produced by the clients 115 of the first database environment 110. The second database environment 130 includes application servers 140 to service requests for database operations from the emulated workload 135. The database operations are carried out on a second database system 145, such as a database system 145 having different operational parameters or a different software version than the first database system 125.

Testing the performance of the second database system 145 under a workload at least similar to that experienced by the first database system 125 can be problematic. Typically, a test database system is evaluated using an artificially generated workload, such as the emulated workload 135. However, these artificial workloads may not accurately reflect the actual workloads experienced by the first, production database system 125. Thus, predicted negative or positive performance impacts observed on the second database system 145 may not accurately reflect performance under a workload experienced by the first database system 125.

Capturing a workload from the first database environment 110 to run at the second database environment 130 can also be problematic. For example, it may be difficult to capture all the inputs necessary to replicate the workload generated by the clients 115. In addition, the capture process itself may negatively impact the performance of the first database system 125, such as by increasing the processing load on a computing system operating the database system, or delaying processing of operations on the first database system 125.

Figure 2:
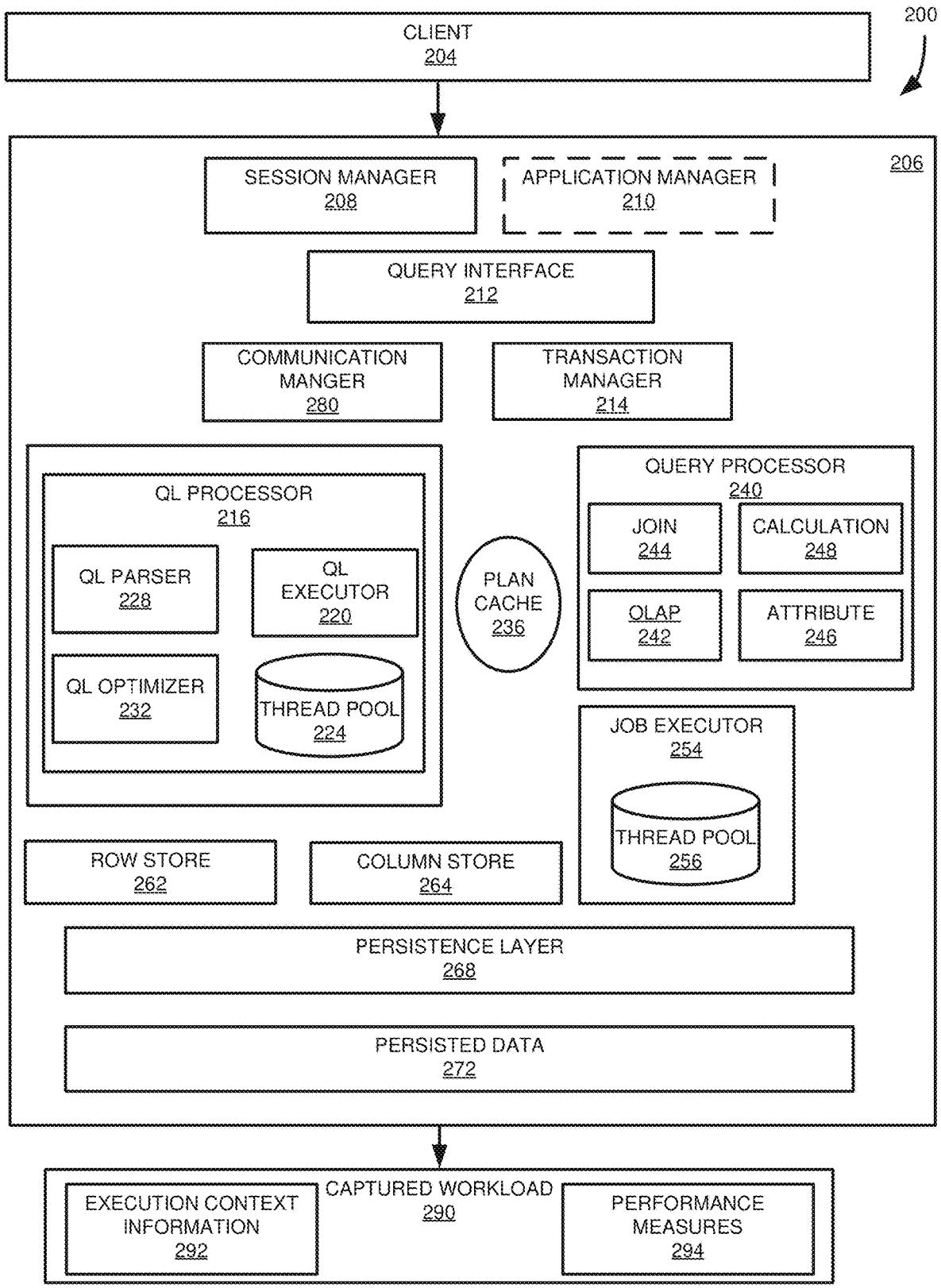
FIG. 2) is a diagram depicting a database environment providing for processing of requests for database operations.

FIG. 2 illustrates an example database environment 200. The database environment 200 can include a client 204. Although a single client 204 is shown, the client 204 can represent multiple clients. The client or clients 204 may be OLAP clients, OLTP clients, or a combination thereof.

The client 204 is in communication with a database server 206. Through various subcomponents, the database server 206 can process requests for database operations, such as requests to store, read, or manipulate data. A session manager component 208 can be responsible for managing connections between the client 204 and the database server 206, such as clients communicating with the database server using a database programming interface, such as Java Database Connectivity (JDBC), Open Database Connectivity (ODBC), or Database Shared Library (DBSL). Typically, the session manager 208 can simultaneously manage connections with multiple clients 204. The session manager 208 can carry out functions such as creating a new session for a client request, assigning a client request to an existing session, and authenticating access to the database server 206. For each session, the session manager 208 can maintain a context that stores a set of parameters related to the session, such as settings related to committing database transactions or the transaction isolation level (such as statement level isolation or transaction level isolation).

For other types of clients 204, such as web-based clients (such as a client using the HTTP protocol or a similar transport protocol), the client can interface with an application manager component 210. Although shown as a component of the database server 206, in other implementations, the application manager 210 can be located outside of, but in communication with, the database server 206. The application manager 210 can initiate new database sessions with the database server 206, and carry out other functions, in a similar manner to the session manager 208.

The application manager 210 can determine the type of application making a request for a database operation and mediate execution of the request at the database server 206, such as by invoking or executing procedure calls, generating query language statements, or converting data between formats useable by the client 204 and the database server 206. In particular examples, the application manager 210 receives requests for database operations from a client 204, but does not store information, such as state information, related to the requests.

Once a connection is established between the client 204 and the database server 206, including when established through the application manager 210, execution of client requests is usually carried out using a query language, such as the structured query language (SQL). In executing the request, the session manager 208 and application manager 210 may communicate with a query interface 212. The query interface 212 can be responsible for creating connections with appropriate execution components of the database server 206. The query interface 212 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 214. The transaction manager component 214 can be responsible for operations such as coordinating transactions, managing transaction isolation, tracking running and closed transactions, and managing the commit or rollback of transactions. In carrying out these operations, the transaction manager 214 can communicate with other components of the database server 206.

The query interface 212 can communicate with a query language processor 216, such as a structured query language processor. For example, the query interface 212 may forward to the query language processor 216 query language statements or other database operation requests from the client 204. The query language processor 216 can include a query language executor 220, such as a SQL executor, which can include a thread pool 224. Some requests for database operations, or components thereof, can be executed directly by the query language processor 216. Other requests, or components thereof, can be forwarded by the query language processor 216 to another component of the database server 206. For example, transaction control statements (such as commit or rollback operations) can be forwarded by the query language processor 216 to the transaction manager 214. In at least some cases, the query language processor 216 is responsible for carrying out operations that manipulate data (e.g., SELECT, UPDATE, DELETE). Other types of operations, such as queries, can be sent by the query language processor 216 to other components of the database server 206. The query interface 212, and the session manager 208, can maintain and manage context information associated with requests for database operation. In particular implementations, the query interface 212 can maintain and manage context information for requests received through the application manager 210.

When a connection is established between the client 204 and the database server 206 by the session manager 208 or the application manager 210, a client request, such as a query, can be assigned to a thread of the thread pool 224, such as using the query interface 212. In at least one implementation, a thread is a context for executing a processing activity. The thread can be managed by an operating system of the database server 206, or by, or in combination with, another component of the database server. Typically, at any point, the thread pool 224 contains a plurality of threads. In at least some cases, the number of threads in the thread pool 224 can be dynamically adjusted, such in response to a level of activity at the database server 206. Each thread of the thread pool 224, in particular aspects, can be assigned to a plurality of different sessions.

When a query is received, the session manager 208 or the application manager 210 can determine whether an execution plan for the query already exists, such as in a plan cache 236. If a query execution plan exists, the cached execution plan can be retrieved and forwarded to the query language executor 220, such as using the query interface 212. For example, the query can be sent to an execution thread of the thread pool 224 determined by the session manager 208 or the application manager 210. In a particular example, the query plan is implemented as an abstract data type.

If the query is not associated with an existing execution plan, the query can be parsed using a query language parser 228. The query language parser 228 can, for example, check query language statements of the query to make sure they have correct syntax, and confirm that the statements are otherwise valid. For example, the query language parser 228 can check to see if tables and records recited in the query language statements are defined in the database server 206.

The query can also be optimized using a query language optimizer 232. The query language optimizer 232 can manipulate elements of the query language statement to allow the query to be processed more efficiently. For example, the query language optimizer 232 may perform operations such as unnesting queries or determining an optimized execution order for various operations in the query, such as operations within a statement. After optimization, an execution plan can be generated for the query. In at least some cases, the execution plan can be cached, such as in the plan cache 236, which can be retrieved (such as by the session manager 208 or the application manager 210) if the query is received again.

Once a query execution plan has been generated or received, the query language executor 220 can oversee the execution of an execution plan for the query. For example, the query language executor 220 can invoke appropriate subcomponents of the database server 206.

In executing the query, the query language executor 220 can call a query processor 240, which can include one or more query processing engines. The query processing engines can include, for example, an OLAP engine 242, a join engine 244, an attribute engine 246, or a calculation engine 248. The OLAP engine 242 can, for example, apply rules to create an optimized execution plan for an OLAP query. The join engine 244 can be used to implement relational operators, typically for non-OLAP queries, such as join and aggregation operations. In a particular implementation, the attribute engine 246 can implement column data structures and access operations. For example, the attribute engine 246 can implement merge functions and query processing functions, such as scanning columns.

In certain situations, such as if the query involves complex or internally parallelized operations or sub-operations, the query executor 220 can send operations or sub-operations of the query to a job executor component 254, which can include a thread pool 256. An execution plan for the query can include a plurality of plan operators. Each job execution thread of the job execution thread pool 256, in a particular implementation, can be assigned to an individual plan operator. The job executor component 254 can be used to execute at least a portion of the operators of the query in parallel. In some cases, plan operators can be further divided and parallelized, such as having operations concurrently access different parts of the same table. Using the job executor component 254 can increase the load on one or more processing units of the database server 206, but can improve execution time of the query.

The query processing engines of the query processor 240 can access data stored in the database server 206. Data can be stored in a row-wise format in a row store 262, or in a column-wise format in a column store 264. In at least some cases, data can be transformed between a row-wise format and a column-wise format. A particular operation carried out by the query processor 240 may access or manipulate data in the row store 262, the column store 264, or, at least for certain types of operations (such as a join, merge, and subquery), both the row store 262 and the column store 264.

A persistence layer 268 can be in communication with the row store 262 and the column store 264. The persistence layer 268 can be responsible for actions such as committing write transaction, storing redo log entries, rolling back transactions, and periodically writing data to storage to provided persisted data 272.

In executing a request for a database operation, such as a query or a transaction, the database server 206 may need to access information stored at another location, such as another database server. The database server 206 may include a communication manager 280 component to manage such communications. The communication manger 280 can also mediate communications between the database server 206 and the client 204 or the application manager 210, when the application manager is located outside of the database server.

In some cases, the database server 206 can be part of a distributed database system that includes multiple database servers. At least a portion of the database servers may include some or all of the components of the database server 206. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 206 may need to access other database servers, or other information sources, within the database system. The communication manager 280 can be used to mediate such communications. For example, the communication manager 280 can receive and route requests for information from components of the database server 206 (or from another database server) and receive and route replies.

One or more components of the database environment 200, including components of the database server 206, can be used to produce a captured workload 290 that includes execution context information 292 and one or more performance measures 294. The captured workload 290 can be replayed, such as after being processed, at another database system.

Example 8)—Capture Mechanism and Structure

Figure 3:
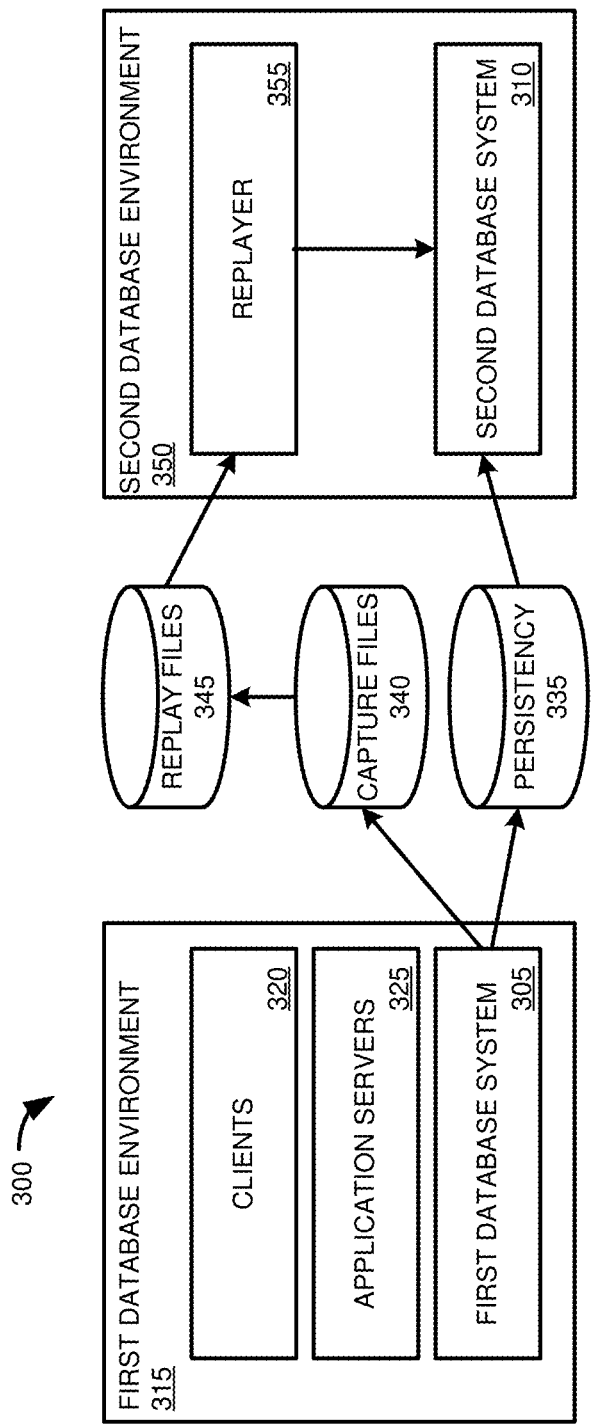
FIG. 3) is a diagram illustrating database environments for capturing a database workload at a first database system and replaying the workload at a second database system.

FIG. 3 provides a diagram of a database environment 300 for implementing a method according to this Example 2 for comparing a first database system 305 with a second database system 310. In some cases, the first database system 305 and the second database system 310 use different versions of the same computer program. In other cases, the first database system 305 and the second database system 310 use the same version of the same computer program, but with different settings. In yet further cases, the first database system 305 and the second database system 310 may use different computer programs for implementing a database system.

The first database system 305 is part of a first database environment 315. The first database environment 315 can include one or more clients 320 issuing requests for database operations to one or more application servers 325. The one or more application servers 325 can send the requests for database operations to be carried out by the first database system 305.

In carrying out the requests, the first database system 305 can store information regarding the operations in a persistency layer 335. The persistency layer 335 can include, for example, data stored in a persistent, non-transitory computer-readable storage medium. In addition, the first database system 305 can generate information about the requests, which can be stored, such as in one or more capture files 340. The capture files 340 can include information regarding the request (including the request), data, including metadata, generated during execution of the request, the results of the request, and information about the first database environment 315, the clients 320, or the first database system 305. In at least some cases, the capture files 340 can be stored in a compressed format.

In some cases, each capture file 340, or a particular collection of files includes data associated with, and organized by, a capture unit. The capture unit can be, for example, a session, such as described in Example 1, between a client 320 and the first database system 305 mediated by an application server 325. The session may include one or more requests for database operations, such as one or more statements in a query processing language, such as a query or a transaction. In other cases, the captures file 340, or particular collection of files, represents another processing unit, such as a statement, or a collection of statements over a time period.

The capture files 340 can be processed, such as by the first database system 305, the second database system 310, or another computing system, to produce data, such as replay files 345, suitable for being replayed at a second database environment 350, which includes the second database system 310. The replay files 345 can, for example, decompress information in the capture files 340, or otherwise manipulate the data of the capture files 340 into a form more easily executed at the second database environment 350. In addition to information used for replaying requests for database operations, the capture files 340 can include information that is used to evaluate the performance of the second database system using the captured workload, instead of, or in addition to, being used for replay purposes.

The second database environment 350 can including a replayer component 355. The replayer component 355 may use the replay files 345 to send requests for database operations to the second database system 310 that emulate the requests issued by the clients 320 to the first database environment 315.

The system of FIG. 3 can provide a number of advantages. For example, in at least some cases, the capture files 340 can be generated using components of the first database system 305. For example, information in the capture files 340 can include information generated by components of the first database system 305 in carrying out a request for a database operation. The use of existing components, operations, and generated data can reduce the processing load on the first database system 305 in saving a workload, or elements thereof, to be replayed at the second database system 310. In at least some cases, the capture files 340 can include less than all of the information generated during execution of the requests for database operations at the first database system 305, which can also reduce the amount of memory or storage needed to reproduce the workload at the second database system 310. In addition, the conversion of capture files 340 to replay files 345 can be carried out asynchronously and at a different computing system than the first database system 305.

Information included in the capture files 340 can come from one or more sources. In some implementations, capture files 340 can be organized by, or otherwise include data for, capture units, such as database sessions, or another set or subset of requests for database operations. A capture unit, its operations, and data and metadata created during execution of requests for database operations contained in the capture unit (including data returned in response to a query language statement, such as query results), can be associated with a context. In at least some aspects, a context, such as an execution context, is information that describes, or provides details regarding, a particular capture unit, which can be represented by a fact. As described below, the capture unit can be associated with additional facts, such as performance measures.

For example, the session itself may be associated with a session content. The session context can include information such as:

how statements or transactions are committed, such as whether statements are automatically committed after being executed transaction isolation level, such as read committed or repeatable read client geographical location syntax used in the session, such whether strings are null terminated how deferred writing of large objects is carried out a connection identifier a user identifier/user schema an application identifier verbosity settings for logging task execution identifiers debugger information As previously mentioned, elements of a session, such as a transaction, can also be associated with a context. A transaction context can include information such as:

snapshot timestamp (such as used for multi-version concurrency control)

statement sequence number commit ID updates to a transaction identifier

Similarly, when the statement is a query, such as a query having a query execution plan (as described in Example 1), a plan context can include information such as:

query ID/query string query plan compilation time statement hash memory statistics associated with the statement or plan Applications interacting with the database system may be associated with a context, an application context can include information such as:

application name application user name application source code identifier a client identifier location information variable mode (such as whether strings are null terminated)

Along with these various contexts, various values, such as facts or performance measures, associated with a workload capture unit, or an element thereof, may be of interest, and stored in the capture files 340. For example, facts or measures may include:

an identifier, such as a timestamp, associated with the capture unit elapsed time (such as session duration)

processor usage memory usage number of executions carried out number of network calls number of input/output operations any waits encountered while the session was active In some cases, the capture files 340, such as one or more of the contexts and the measure, can include non-deterministic values, such as non-deterministic values associated with a query language statement or its associated operations. Nondeterministic values refer to values that may be different between different computing devices (e.g., different between a database system (or server thereof) where a workload is captured and a database system (or a server thereof) where the workload is replayed. For example, a timestamp function will return a current timestamp value when run on the first database system 305, which may be a different timestamp value than when run at a later time on the second database system 310. Other examples of non-deterministic values include updated database sequence values, generation of random numbers, connection identifiers, and identifiers related to updated transactions.

In particular examples, it can be beneficial to use the same nondeterministic value as used during execution of a request for a database operation at the first database system 305 when the request is carried out at the second database system 410. In implementations where the same value is to be used, the nondeterministic function can be evaluated once (e.g., on the first database system 305) and the resulting value can be provided in the capture files 340 so that when the request (or other workload element) is executed on the second database system 310, the same value will be used (the same value that was used at the workload capture database system).

Although workload capture has been described as occurring with external clients 320, in at least some embodiments, workload capture may also include capture of internal database operations for inclusion in the workload capture files 340. The captured internal operations can be replayed at the second database environment 350. For example, the replay of the captured internal operations at the second database environment 350 may affect the performance of the second database system 310, including the performance of replayed workload elements originating at the clients 320. In other examples, the captured internal operations are not replayed at the replica database system 310, but are used to compare the performance of the first database system 305 with the performance of the second database system 310. For example, the performance comparison can include comparing a number of internal operations generated by the workload at the first database system 305 with a number of internal operations generated by the second database system 310.

In some cases, the internal operations may be triggered by a user. In other cases, the internal operations occur automatically during operation of the database system. For example, with reference to FIG. 2, periodically, the state (such as changed records and redo logs) of the database server 206 can be written as persisted data 272 by the persistence layer 268, such as to create a save point. Save points, in some examples, may be requested by a user. In other examples, save points may occur automatically, such as according to a schedule, when a threshold number of records have been changed, or when a threshold number of request for database operations have been received or executed. Similarly, storage snapshots, file system backups, data backups, and log backup operations can be captured and, optionally, replayed.

Changes to database records, such as records in the column store 264, can, in some examples, be written to temporary copies of the database records. Periodically, the changes reflected in the temporary copies can be merged into the source database records. Making changes to temporary copies can improve the performance of write operations, including concurrent write operations. The temporary copies can, for example, be maintained in an uncompressed state, or state with reduced compression, compared with the primary database records. Merge operations can be captured and included in the capture files 340.

Internal operations can also include housekeeping operations. For example, in some cases, the first database system 305 can have recent or often-used data in-memory, and older, or less commonly used, data can be stored in persistent storage, such as persistency 335 or another persistent storage. The capture files 340 can store information regarding the transfer of data between persistent storage and memory.

The capture files 340 may include all or a portion of these contexts, context elements or values, facts, and measures. In addition, the capture files 340 can include additional information, such as information that may be of assistance in replaying the workload at the second database system 310 or in evaluating the performance of the execution of the workload at the first database system 305, such as nondeterministic values.

In at least some implementations, the volume of information that can be collected for a workload can be large. In at least some cases, the volume of information can be reduced by only including a portion of the information, such as a portion of the context information, in the capture files 340. In addition, to assist with organization and compression of the information, in some implementations, the information can be organized in a schema or a dimensional model, such as a star schema. For example, the measures and facts can be used as the central fact table or tables, which reference as points one or more dimensions, each dimension including one or more contexts. In a particular implementation, each point represents a discrete context, and, in addition to any facts or measures, the fact table includes identifiers for corresponding information in the dimensions.

Figure 4:
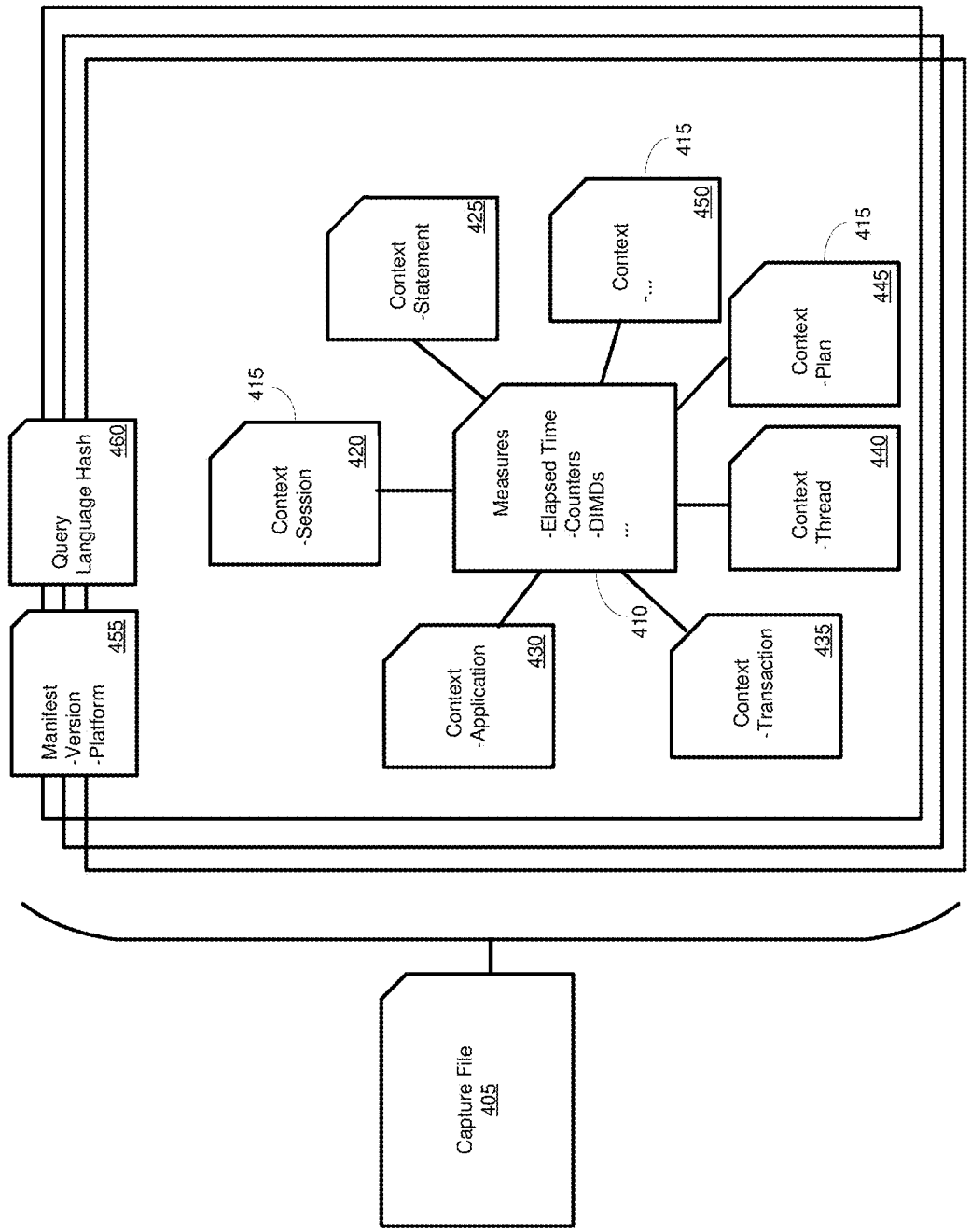
FIG. 4) is a diagram of a workload capture file schema for storing execution context data and performance data.

An example of this schema is shown in FIG. 4. FIG. 4 illustrates a capture file 405 that includes a fact table 410 correlated with a plurality of dimensions 415 associated with the fact table 410. Specifically, the fact table 410 is shown as associated with dimensions 415 representing contexts for a session 420, a statement 425, an application 430, a transaction 435, a thread 440, a plan (such as a query execution plan) 445, and other parameters 450. The fact table 410 includes various measures, such as elapsed time and any counters associated with the capture unit associated with the capture file 340 or collection of capture files (such as a session). The fact table 410 also includes dimension IDs (DIMIDs) used to correlate entries in the fact table 410 with each of the dimensional contexts 420, 425, 430, 435, 440, 445, 450. Although a single fact table 410 is shown, in some implementations, multiple fact tables 410 may be used.

The fact table 410 (or tables) and the dimension tables 415 can include records for a plurality of capture units (such as sessions) of the first database system 305. In some cases, the fact table (or tables) 410 and each of the dimension tables 415 can be stored as separate files. That is, there may be one file for the fact table 410 (when a single fact table is used) and one file for each of the dimension tables 415. In a particular example, the capture file 405 can incorporate the files for the fact table 410 and the files for each of the dimension tables 415. In some cases, the capture file 405 can be compressed, such as using a compression algorithm. Similarly, files for one or more of the fact tables 410 and then dimension tables 415 can be compressed. In implementations where a database system from which a workload is captured includes more than one server or node, the capture file 405 can, in some aspects, represent activity occurring at a single node of the first database system 305. In other aspects, the capture file 405 can be associated with multiple nodes of the first database system 305.

The capture file 405 can include additional information. For example, the capture file 405 is shown as including manifest information 455. Manifest information 455 can include, for example, information related to the first database system 305, such as a identifier for the program version used to implement the first database system 305 and information relating to the computing system used to implement the first database system 305 (such as the number and type of processors, amount and organization of memory and physical storage, information related to networked devices implementing the first database system, or configuration information for the first database system 305 or its components). The manifest information 455 can also include a timestamp associated with the capture file 405 (such a time the capture file was generated, a time the workload capture was initiated, or the time workload capture was discontinued). When filters were used to select workload elements to capture, the filter information can also be included in the manifest information 455. When used to store information related to multiple database nodes, the fact table 410 or dimension tables 415 can include information regarding which of the multiple database nodes was involved in executing operations of the workload capture unit, or a subcomponent thereof (such as in executing a statement associated with a particular session). In a particular example, the manifest information 455 can be stored in a file, such as a compressed file, and included within the capture file 405.

The capture file 405 can also include hash information 460. For example, query language statements in the fact table 410 or the dimension tables 415 can be represented by a hash. The hash information 460 can include a hash table correlating hash values to query language statements. By only storing the hash value of the query language statement in the measure file 410 or one or more of the context files 415, the amount of memory needed to store the workload capture can be reduced.

Hash values can be used to confirm that execution of requests for database operations at the second database system 310 produced the same results as when originally executed at the first database system 305. In some cases, the granularity of hashing can be specified, such as by a user, in such cases, the hash level can be included in the capture file 405, such as in the manifest information 455.

In particular examples, the fact table 410 and the dimension or context tables 415 can be stored as files, and the fact or dimension files grouped together in the context file 405, optionally including a file for the manifest information 455 or a file for the hash information 460. In a particular example, each of the context tables 415 is stored as a separate file within the capture file 405. Each of the capture files can include a dimension identifier (DIMID) field, and one or more value fields. In a specific example, the values can be written in comma separated value format. Similarly, each measure can be stored as a separate file within the capture file 405. Each of the measure files can include a chronological identifier, such as a clock timestamp (such as for the overall database system from which the workload was captured). The chronological identifier can be used, for example, in staging replay of the capture units (such as sessions) represented in the capture file 405. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some cases, context files and one or more measure files can be stored for each of a plurality of services in a database system. The set of context files and one or more measure files for each of the services can be included in the capture file 405 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or http-based interactions, that manage various memory stores (such as transferring data between persistent storage and in-memory storage), and that monitor resource (such as CPU or memory) use in the database system (including across multiple database servers, when the database system is a distributed system).

Figure 5:
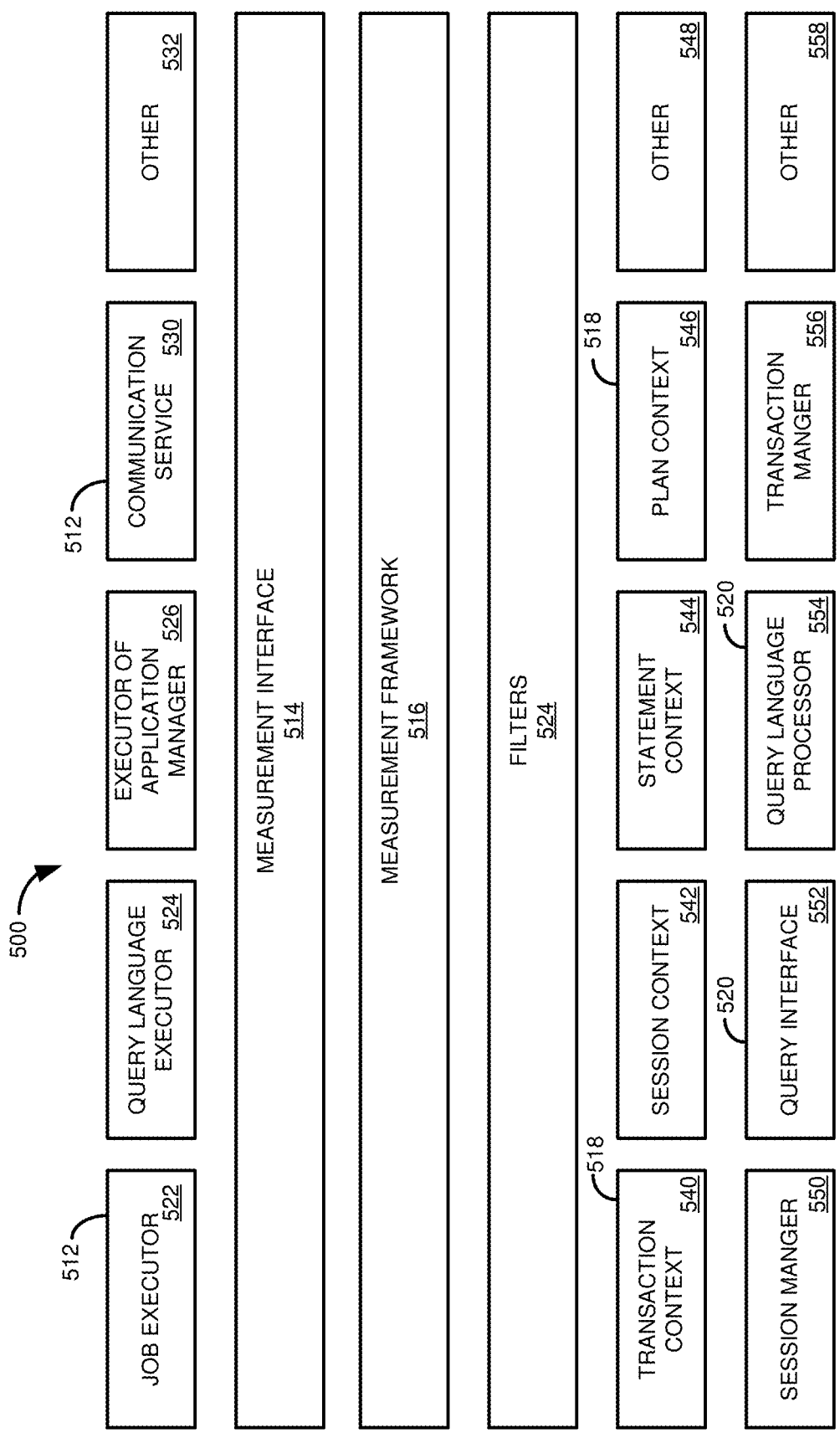
FIG. 5) is a block diagram of an example software architecture for implementing workload capture according to an embodiment of the present disclosure.

FIG. 5 illustrates components of a database environment 500 that can be used to measure and collect workload capture information to be stored, such as in the capture file 405 of FIG. 4. In at least some cases, the measuring and collecting can be carried out by existing components of a database system. For example, the measuring and collecting can be carried out during normal processing of requests for database operations. In this way, the overhead (such as processor load and delay) associated with the capture process can be reduced.

As shown in FIG. 5, the database environment 500 includes measuring (or execution) components 512, a measurement interface 514, a measurement framework 516, contexts 518, and context management components 520. Each of the measuring components 512 can be responsible for executing various processes associated with a request for a database operation. The measuring components 512 can provide measures or facts associated with a request for a database operation. In some cases, in executing the requests, the measuring components 512 can generate data about the execution of the request, or used in carrying out the request. For example, the measuring components 512 can generate performance information associated with execution of the request.

The measuring components 512 can be registered with the measurement framework 516 using the measurement interface 514. The measurement framework 516 can collect information generated by, or otherwise associated with, the measuring components 512. The measurement framework 516, optionally in conjunction with one or more additional components, can be responsible for generating the capture file 405 of FIG. 4, including the dimension or context tables 415, the fact table or tables 410, the manifest information 455, and the query language hash file 460. In at least some cases, the use of multiple fact or context tables or files allows multiple tables or files to be written in parallel, which can speed the workload capture process.

As discussed above, in at least some implementations, the contexts 518 may include more information than may be needed to replay the requests for database operations in a second database environment, or to compare the performance of the first database system with a second database system. In such cases, a filter layer 524 can be included between the measurement framework 516 and the contexts 518 associated with the measuring components 512. The filter layer 524 can be configured to pass selected information from contexts 518 to the measurement framework 516.

The contexts 518 can be managed, or used, by the context management components 520. In addition, the context management components 520 can be used to provide information to the contexts 518 or to the measuring components 512. In some cases, the context management components 520 can be responsible for information in a context 518 related to dimensional data associated with the context.

Measuring components 512 can include a job executor 522, a query language executor 524, an executor for an application manager 526, a communication service 530, and other components 532 (such as components executing internal database operations, such as merge and savepoint operations). Contexts 518 can include a transaction context 540, a session context 542, a statement context 544, a plan context 546, and other contexts 548 (such as contexts associated with internal database operations). Context management components 520 can include a session manager 550, a query interface 552, a query language processor 554, a transaction manger 556, and others 558 (such as a component managing a context for an internal database operation).

As an example, one context management component 520 can be the session manager component 550, such as the session manager 208 of FIG. 2. The session manager component 550 can coordinate particular sessions, including requests for database operations associated with the sessions. The session manager component 550 can, for example, store information associated with a session in the session context 542. The session context 542 can include values for the parameters identified for the session context table 420 of FIG. 4.

Another of the contexts 518 can be a plan context 546. The plan context 546 can include values for parameters such as described above for the plan context table 445 of FIG. 4. The plan context 546 can, in some cases, be managed by the query language processor 554, such as the query language processor 216 of FIG. 2. The query language processor 554 can also manage a statement context 544. The statement context 544 can include values for parameters such as allowed memory usage, allowed CPU usage, number of allowed parallel threads, priority, user ID, and a sequence identifier.

For a particular capture unit, the measurement framework 516 can aggregate facts and measures, such as performance measures, generated by the measuring units 512 and associate them with the corresponding contexts 518 for the capture unit. The aggregated facts and measures, and the corresponding context information, can be stored in a capture file, such as using the schema of FIG. 4.

Figure 6:
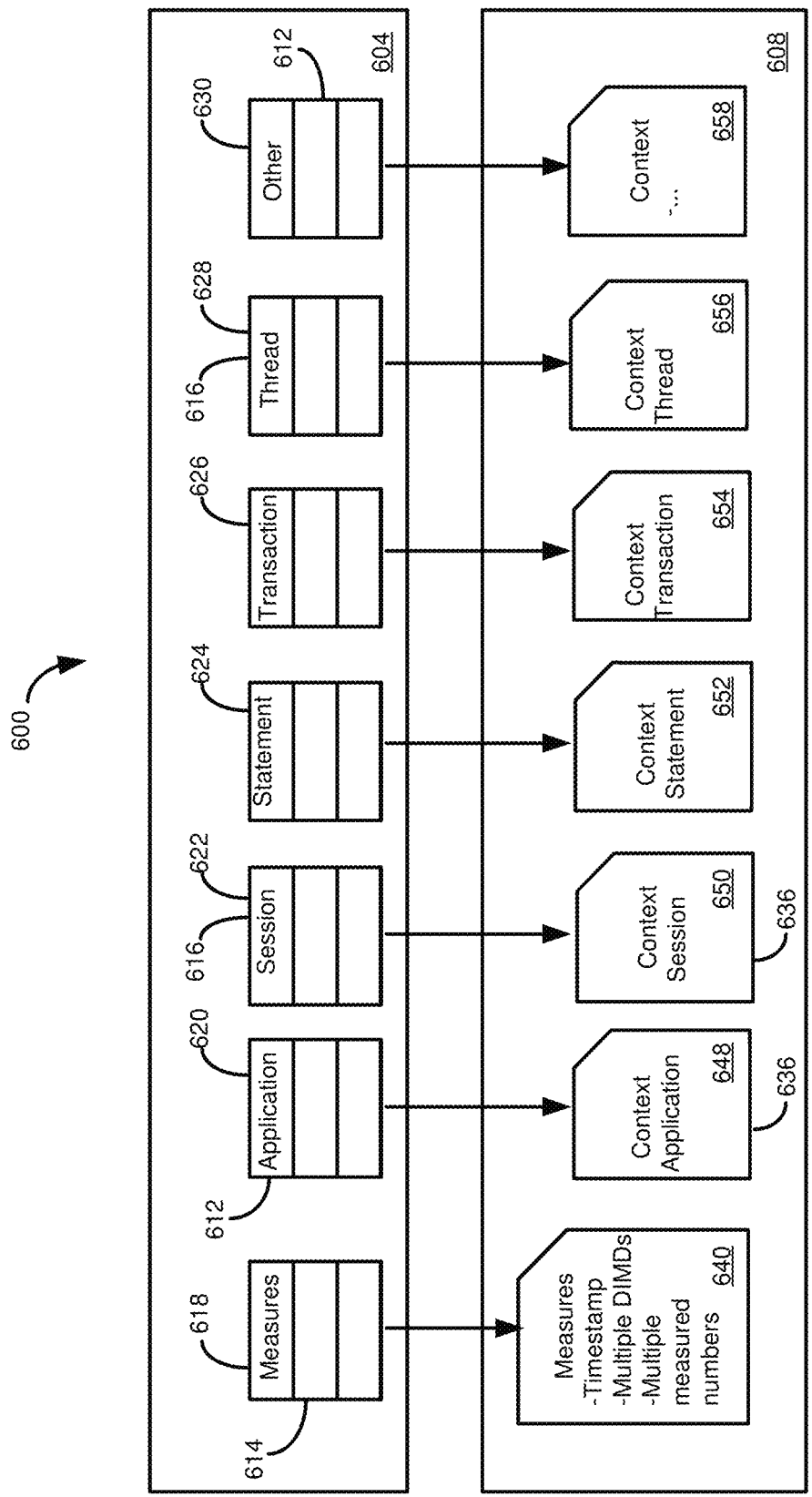
FIG. 6 is a diagram depicting storing, such as writing to a plurality of files, of buffered workload capture data according to an embodiment of the present disclosure.

FIG. 6 illustrates a database environment 600 depicting a process for storing information from a measurement framework 604 in a capture file 608, such as capture file using the schema of FIG. 4. For each of the capture units, the measurement framework 604 can store a mapping of facts and measurements associated with the capture unit with the corresponding context information. In particular examples, the mapping can be stored in memory, such as in buffers 612 for each of a plurality of contexts and a buffer 614 for measures 618 associated with capture units. FIG. 6 illustrates buffers 612 for contexts 616, including an application context 620, a session context 622, a statement context 624, a transaction context 626, a thread context 628, and, optionally, other contexts 630.

The buffers 612 can be written to the schema of the capture file 608. In some cases, the buffers 612 can be written to separate files 636 for each of the contexts 616, such as files for context data for an application 648, a session 650, a statement 652, a transaction 654, threads 656, and, optionally, other context information 658. The buffer 614 can be written to a measure file 640. The data in the buffers 612, 614 can be compressed prior to being written.

Although a single buffer 614 and a single measure file 640 are shown for the measures 618, in other cases, multiple buffers 614 or files 640 can be used. For example, multiple buffers 614 can be used when the capture file 608 includes multiple measure files 640, or information from multiple buffers 614, such as buffers representing different measures or facts, can be aggregated into one or more measure files 640. The measure file 640 can store information for one or more capture units, including an identifier, one or more facts or measures, and identifiers for context information stored in the context files 636.

In some cases, the buffers 612, 614 may be written to their corresponding files 636, 640 when a workload capture is completed. In other cases, the buffers 612, 614 can be written periodically during workload capture. For example, each of the buffers 612 and the buffer 614 can be assigned a threshold size. If a particular buffer of the buffers 612, or the buffer 614, exceeds the threshold, the buffer can be written to its corresponding file 636, 640 and emptied. In other cases, the buffers 612, 614 can be written periodically in another manner, such as at particular time intervals or after a particular number of capture units have been added to the buffers. When the workload capture process has been completed, the files 636, 640 can be combined, such into the capture file 405 of FIG. 4. In particular examples, the files 636, 640 can be compressed as they are combined.

The database environment 600 may be implemented in a different manner. In a particular implementation, rather than a single buffer for each of the contexts 616 and the buffer 614 for the measures 618, the database environment can include multiple buffers. For example, two (or more) buffers can be included for each of the contexts 616 and for the measures 618. Data can be written to the first buffers until a buffer is filled, at which time it can be written to a file as described above. During the writing process, information can be stored in the second buffer, which is then written when filled, and new data stored in the first, now empty, buffer. Also, rather than having separate buffers for each of the contexts 616 and the measures 618, the contexts and/or measures may be stored in a common buffer. When filled, the buffer can be written to respective context and measure files 636, 640. The environment 600 can include one or more additional common buffers to be used when a first common buffer is being written.

Figure 7:
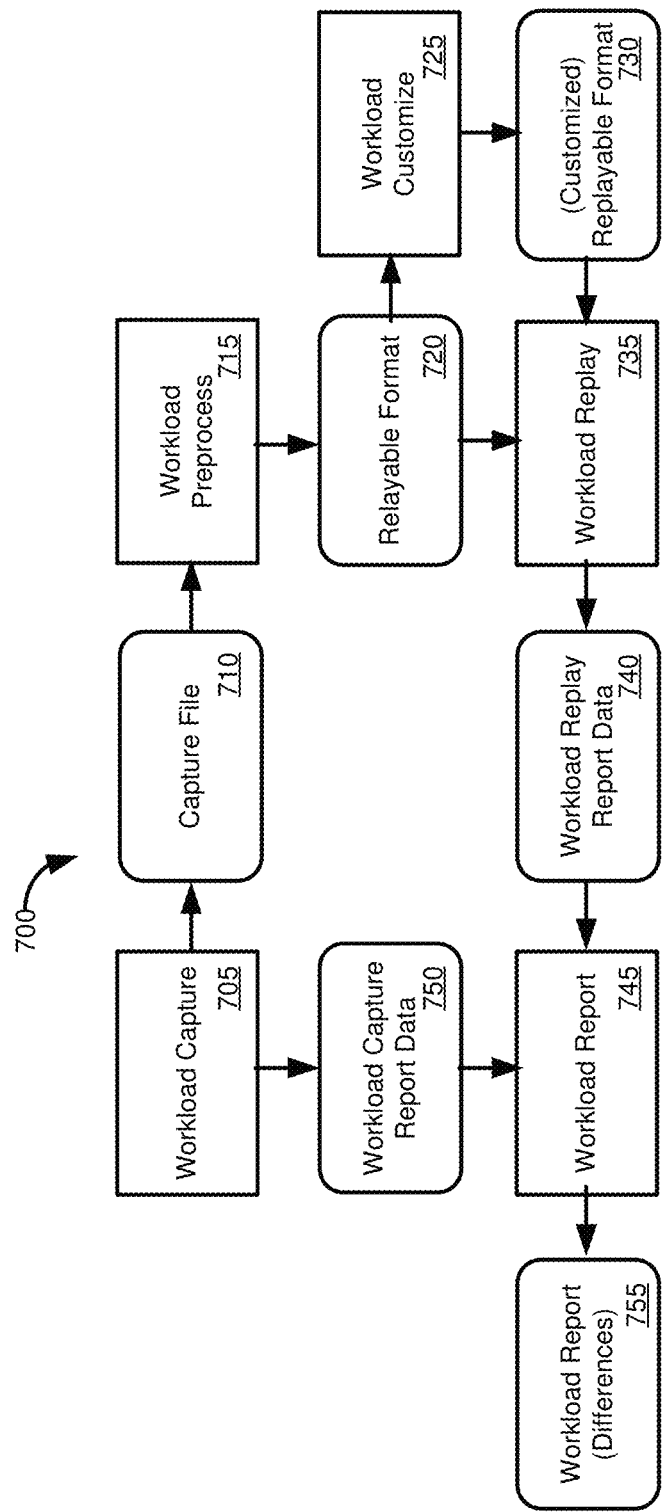
FIG. 7 is a diagram illustrating a method for comparing the performance of a first database system with a second database system.

FIG. 7 is a diagram of a process 700 for comparing performance statistics of a workload executed at a first database environment with performance statistics of the workload executed at a second database environment. In step 705, a workload, such as one or more requests for database operations (which may be associated with one or more database sessions) is captured at a source system, such as described in conjunction with FIGS. 2-5. The capture process 705 generates a capture file 710, such as a capture file having the structure of the capture file 405 of FIG. 4.

The capture file 710 is processed in process 715 to produce captured requests for database operations and associated data in a replayable format 720. The processing in step 715 can include extracting or decompressing individual context and measure files from the workload capture file 710. If the individual context and measure files were compressed, they can also be extracted or decompressed.

During step 715, individual capture units, such as sessions, and/or subcomponents thereof (e.g., statements) can be reconstructed from the context and measure files. For a particular measure, relevant context information can be retrieved based on dimension or context identifiers stored with the measure. For example, statements in a session can be associated with corresponding context information, such as a query language statement and context information (or triggers to generate the context information) that would have been received by the database system from which the workload was captured.

In some cases, the capture units, and operations within the capture units, can be ordered during the processing step 715. For example, the capture units, or operations, can be ordered chronologically use a time associated with the capture units or operations (e.g. a system timestamp, commit timestamp, or other identifier). In other cases, the capture units are reconstructed during processing step 715, but are not ordered. Ordering can occur, for example, during replay of the replayable format 720.

In particular examples, the replayable format 720 can be a replay file, such as a file stored on a hard disc or other persistent storage medium or non-volatile memory. In other examples, the replayable format 720 can be stored in a different manner, such as in volatile memory. While in some cases the replayable format 720 may be a single store or file, in other cases information in the repayable format 720 can be included in multiple stores or files.

The replayable format 720, including a replay file, can include information regarding the workload capture process and workload capture system, such as a database software version associated with the source data system, information regarding the configuration (including processors and available memory) of the source database system, and start and end times for the workload capture. The replayable format 720 can also include information regarding any filters applied to workload elements being captured, such as workload elements associated with particular applications, users, clients, statement types, or elements exceeding a threshold duration. Statistics regarding the capture process, such as the number of capture units (e.g., sessions), statements, and/or committed transactions recorded in the replayable format 720 can also be stored in the replayable format 720. The replayable format 720 can further include information regarding the processing step 715, such as a software version associated with a processing component generating the replayable format, information about a computing system used to carrying out the processing step, and start and end times for the processing.

The replayable format 720 can include additional information. For example, information can be included regarding database users, such as information that would have been transmitted to the source database system when the workload was generated. Information regarding query language elements can be included in the replayable format 720, such as codes for DDL (data definition language), DML (data manipulation language, e.g., SELECT, UPDATE), and DCL (data control language) operations. The replayable format 720 can also include information regarding query language statement strings, such relating an identifier (such as a hash value) to a particular query language statement string.

Other types of information that can be included in the replayable format 720 include information regarding the number of batch updates at the source database system during workload capture, values of nondeterministic functions, and information regarding nested statement in workload capture units, or elements thereof (such as in CALL statements). Hash value results, such as those used to verify consistent execution between the source database system and the second database system can be included in the replayable format 720.

The replayable format 720 can also include information, including in individual files, related to individual capture units, such as database sessions. Information for the capture units can include connection identifiers, information regarding the capture unit, or suboperations thereof, such as a start time for a request, a request type, and context information associated with the request. Parameters, such as measures, associated with the capture unit can be included in the replayable format 720. The replayable format 720 can also include identifier information for the capture unit, such as a session ID, a username, a particular schema associated with the user, etc.

In optional process 725, the captured workload in the replayable format 720 can be customized to produce a customized captured workload in a replayable format 730. For example, process 725 can include selecting particular users, clients, applications, sessions, etc. associated with the first database environment to be replayed at the second database environment. A user may also select particular segments of a captured workload to be replayed, rather than replaying an entire workload, or can merge multiple workloads (or segments thereof) to be replayed, such as simultaneously or sequentially. In some aspects, a user can also select the speed at which the workload should be replayed. That is, in some cases, requests for database operations can be replayed with the same time interval experienced at the source system. In other cases, the user can select the workload to be replayed in another manner, such as increasing or decreasing the replay speed versus the speed database operations were carried out at the source database system.

In process 735, the captured workload in the replayable format 720, or the customized workload in replayable format 730, is replayed at the second database environment. The replay 735 can include reading information associated with individual capture units, or operations thereof, from the replayable format 720. In some cases, the information can be read sequentially from the replayable format 720. In other cases, a replayer component can select capture units, or operations thereof, to be replayed in a particular order. For example, the replayer may select capture units, or operations, in the replayable format 720 to be replayed based on order in which the capture units or operations were received by the source database system, such as a chronological order. The chronological order can be determined, for example, using an identifier (e.g., a system timestamp, a commit timestamp, or other identifier).

In at least come cases, the replayer cause multiple capture units, or operations, to be sent to, or replayed at, the second database system. In particular implementations, workload elements received by the second database system, to be replayed, can be received in a format analogous to the format in which they were received by the source database system. That is, the replay information can resemble requests for database operations produced by an external database client (or by internal database operations of the source database system). The replay 735 produces an output 740, such as workload replay report data, which includes performance measures associated with the execution of the workload at the second database environment.

A workload report process 745 can be carried out, such as comparing workload replay report data with workload capture report data 750, such as data including performance measures associated with the execution of the workload at the first database environment, such as performance measures associated with the capture file 710, the workload in the replayable format 720, or the workload in the customized workload replayable format 730. In at least some implementations, one or both of the workload capture report data 750 and the workload replay report data 740 can be structured as, or include information in, the capture file 405 of FIG. 4.

The workload report process 745 can produce a workload report 755, such as a report comparing execution of the workload at the first database environment with execution at the second database environment. For example, the workload report can include information regarding processor usage, wait times (such as average execution time), query language statement throughput (such as the number of executed statements), number of connections with other database servers or other components, query performance, comparisons of query results or query plans between two database systems, candidate and execution locations of statements, and information regarding the consistency of tables between the two database environments.

Figure 8:
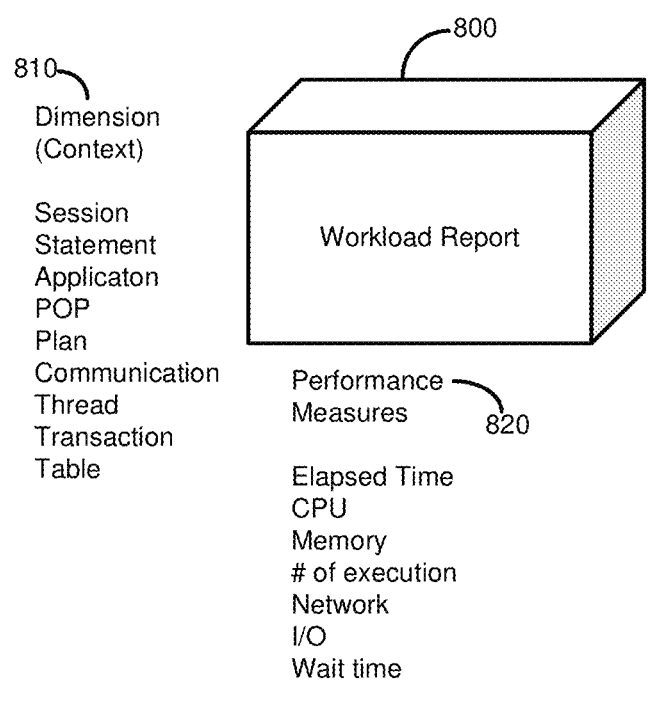
FIG. 8 is a diagram depicting an OLAP cube of workload report useable to compare the performance of a first database system with a second database system according to an embodiment of the present disclosure.

The workload report 755 can include information comparing and summarizing the performance of the entire workload replay, or individual elements of the workload replay. For example, the report 755 can provide information comparing the execution of particular capture units, or particular operations within a capture unit. In a particular example, the report 755 is stored as database records or is derived from database records, such as in an OLAP cube. FIG. 8 illustrates an OLAP cube 800, and dimensions 810 and measures 820 that can be included in the cube. In some cases, the OLAP cube 800 can be a hypercube, having more than three dimensions 810.

Figure 9:
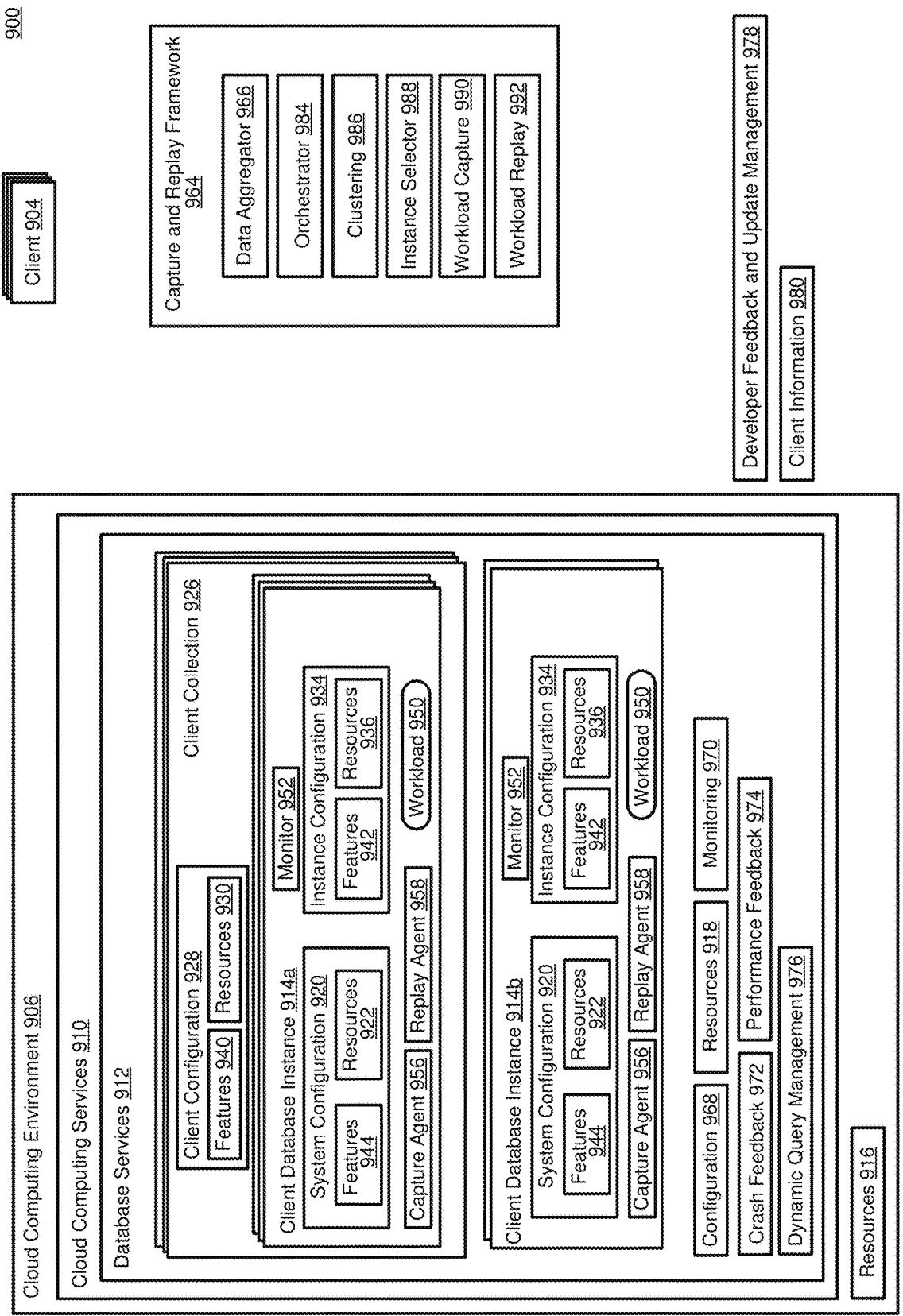
FIG. 9 is a diagram of an example computing environment in which disclosed techniques can be implemented.

Example 4—Example Computing Environment for Obtaining Database Instance Attribute Information and Use Thereof in Clustering Database Instance for Use in Workload Capture or Replay FIG. 9 illustrates an example computing environment 900 in which disclosed techniques can be implemented. The computing environment 900 includes one or more clients 904 that interact with a cloud computing environment 906. The cloud computing environment 906 provides one or more cloud computing services 910, including database services 912.

The database services 912 host one or more client database instances 914 (shown as 914a, 914b). In some cases, a client can have a single client database instance 914b, while in other cases a given client can have multiple client database instances 914a.

Typically, a cloud service provider provides the cloud computing environment 906, or at least particular cloud computing services 910. A software company may provide the database services 912, and may establish the cloud computing environment with another company. For example, SAP HANA CLOUD can be used with cloud computing solutions such as AMAZON WEB SERVICES or MICROSOFT AZURE. One or more cloud service providers can thus provide computing resources 916.

The client database instances 914 are assigned a portion of the computing resources 916 of the cloud computing environment 906 from resources 918 of the resources 916 assigned to the database services 912. For example, the resources 918 can be an amount of processing resources, memory resources (such as RAM), and storage resources (for example, disk space) as assigned as computing resources 922 in a system configuration 920 of a database instance 914. In some scenarios, for clients that have a client instance collection 926 of multiple client database instances 914a, the client instance collection can be assigned a portion of the computing resources 918 as computing resources 930 of a client configuration 928, and the client can configure the allocation of such resources among the client database instances 914a to provide computing resources 936 of an instance configuration 934.

In addition to being assigned computing resources, the client database instances 914 may be assigned, use, or toggle on and off different features. For example, some clients 904 may not need to use particular features of a database system, and so may selectively choose to enable or disable those features, or they can be enabled or disabled by the provider of the database services 912, including as part of a purchase agreement for database services.

FIG. 9 illustrates feature settings 940 as part of the client configuration 928. Features can be turned on and off for all client database instances 914a using the feature settings 940. In some cases, a client can more granularly control the enablement or configuration of features, such as through feature setting 942 of the instance configuration 934. A provider of the database services 912 may also have control over the enablement or configuration of features, such as through feature setting 944 of the system configuration 920.

For clients with a single database instance 914b, the database instance can be implemented similarly to the database instance 914a, apart from not having client-level settings that might apply to multiple database instances. For example, the single database instance 914b has the system configuration 920 and the instance configuration 934. While the database instance 914a has the client configuration 928, this configuration level may be omitted without departing from the scope of the present disclosure, or the client configuration 928 need not provide additional configuration for every client database instance 914 of the client.

The client database instances 914 process respective workloads 950. As described, a workload can include operations to read, write, or modify data, as well as operations to create, modify, or delete database objects, to perform database maintenance operations (such as a backup operation), to perform actions that can be useful in improving database performance, such as generating prepared statements, generating indices, or partitioning data, among other operations.

The client database instances 914 can include one or more monitoring components 952 that can monitor processing of the workload 950 by a database instance, or other operational aspects of a database instance. The information that can be monitored can include a number of statements or queries processed, information about processing times, or information about a volume of data processed or computing resources used in processing data. As will be further explained, this information can be used in describing database instances, such as for clustering database instances.

Database instances 914 can include one or both of a capture agent 956 or a replay agent 958. Capture agents 956 are included for database instances 914 from which at least a portion of its workload 950 is to be captured. Replay agents 958 are included for client database instances 914 on which a captured workload is to be replayed. The client database instances 914 with a replay agent 958 can represent test systems, rather than "active" client instances that receive tasks in a workload 950 from clients 904. While shown as client database instances 914, database instances that are used for testing/replay need not be associated with clients. That is, a provider of the database services 912 can have its own database instances that are used for testing and replay. These instances may be used to identify software or configuration updates that may be desirable in order to provide improved performance prior to, for example, database software or configuration information being used for client database instances 914.

A capture and replay framework 964 can be used with the database services, including particular database instances that either serve as client database instances 914 or as database instances that are used for testing/replay purposes and not specifically associated with a particular client.

The capture and replay framework 964 includes a data aggregator 966. The data aggregator 966 is responsible for obtaining information regarding client database instances 914. In particular, the data aggregator 966 obtains information for features that are used for classifying database instances 914, such as information from the client configuration 928, the system configuration 920, or the instance configuration 934.

The data aggregator 966 can also obtain information from one or more of the monitoring components 952 for a database instance 914. For example, a monitoring component 952 can record information such as resource use by a database instance 914 or information about its workload 950, which can include, along with resource use, information about numbers and types of operations in the workload, a number of operations in the workload, or performance metrics in executing the workload, such as how long operations took to complete, cache sizes, or information about a number of concurrent operations or the size of an operation queue.

The data aggregator 966 can also obtain information about database instances 914 from components of the database services 912. Configuration information 968 can include information about database software, including version information, or dates when a database instance was last updated.

Information can be retrieved from a monitoring component 970. The monitoring component 970 can store information regarding the operations of the database instances 914, including information from the monitoring component 952. That is, in some cases, the data aggregator 966 retrieves information directly from the monitoring components 952, while in other cases the information can be retrieved from the monitoring component 970.

The monitoring component 970 can also record information such as information about the workload 950 sent to a database instance 914, or information about the operation or performance of a database instance, such as information about connections to a database instance, for example a connection speed or information about connection availability. Connection availability can include loss of connectivity due to a crash or similar issue for a database instance 914, where this information can be tracked in other ways by the monitoring component 952 (including through log information that can be sent from a database instance, such as logs maintained by the monitoring component or another database instance component).

Additional information about database instance crashes can be maintained by a crash feedback component 972. For example, while the monitoring component 970 may record information such as when a database instance crashed, recovered from a crash, or a restart operation was attempted, the crash feedback component 972 can maintain more detailed information about a crash, including information from logs maintained by a database instance 914.

Information from the crash feedback component 972 can be used in generating crash reports, which can include information such as error messages, stack traces, and system configuration information. The crash feedback component 972 can also perform deduplication functions. For example, multiple crash reports, such as from different user sessions, may be generated based on the same "event." Thus, the crash feedback component 972 can perform operations such as grouping information related to the same event, or only recording a single crash event.

In a similar manner, as crash information can be obtained by the data aggregator 966, performance information can be obtained from a performance feedback component 974. The performance feedback component 974 can store information, including key performance indicators. Key performance indicators can include response times, throughput, resource use (including memory leaks), uptime and availability, concurrency, data throughput (the rate at which data is written to or read from a database instance 914, as opposed to, for example, number of transactions or statements processed by the database instance) error rates, or query performance metrics, such as query execution time.

The data aggregator 966 can obtain information from a dynamic query management component 976. The dynamic query management component 976 can be responsible for operations such as distributing workload elements to database instances 914, including by performing actions such as query routing, or throttling or rate limiting, to maintain a desired performance level at a database instance, as well as overall performance of the database services 912. In some cases, the dynamic query management component 976 can perform tasks such as authenticating users to access particular data or anonymizing data. The dynamic query management component 976 can also at least partially be involved in managing the resources 916, such as allocating additional resources to database instances 914 with heavy workloads or deallocating resources from database instances with lighter workloads.

The data aggregator 966 can also obtain information from sources that are "outside" of the database services 912, the cloud computing services 910, or the cloud computing environment 906. One such source is a developer feedback and update management component 978, which can be outside of the cloud computing environment 906 or can be within the cloud computing environment, or one of its internal components. The developer feedback and update management component 978 can be used to coordinate activities to update database instances 914, including performing software or configuration updates on a database instance. Information about these activities can be used in classifying database instances, but the developer feedback and update management component 978 can also be used in actions related to use of such clustering results, such as in selecting database instances on which capture or replay should be performed, or for addressing issues that might be determined after replaying a captured workload.

Client information 980 can also be accessed by the data aggregator 966, where the client information can be stored as part of the cloud computing environment 906 or outside of such environment. Client information 980 can include information about the number of database instances 914 used by or available to a particular client, information about contractual or other obligations to a client (such as service level information), or information about a client's relationship with a provider of the database services 912, such as when the client first executed a transaction to obtain access to the database services.

The data aggregator 966 can obtain data in a variety of ways, such as calling APIs provided by various system components, or providing APIs that can be called by such components. Other ways of communicating can include messaging queues, pub/sub systems, shared databases, file sharing, webhooks, and remote procedure calls (RPC).

An orchestrator 984 oversees a process of selecting database instances for capture or replay. In some cases, a capture agent 956 or a replay agent 958 are deployed to, or activated at, a database instance, including a client database instance 914, in response to being selected by a process coordinated by the orchestrator 984. The orchestrator 984 can be responsible for selecting a set of database instances to be analyzed, which can be all or a portion of the database instances 914.

Once the database instances 914 are selected, feature information can be retrieved from the data aggregator 966. For example, a vector may be defined for use in clustering, with elements of the vector corresponding to different database features.

Vectors produced by the orchestrator 984 can be provided to a clustering component 986. The clustering component 986 generates clusters of database instances from the vectors using techniques such as K-means clustering, hierarchical clustering, DBSCAN, or Gaussian Mixture Models.

The output of the clustering component 986 is clusters of database instances 914. Database instance 914 within a given cluster are comparatively similar to one another—at least, in general, being more similar with respect to one another than with respect to database instances in different clusters. As described, this can allow workloads 950 to be captured from one or more representative database instances 914 within a cluster, rather than performing capture and subsequent replay for all database instances, saving significant computing resources.

Once clusters are defined, one or more database instances 914 can be selected for workload capture using an instance selector 988. The instance selector 988 can apply one or more rules in selecting database instances from a cluster, where the rules can be implemented or changed as desired, and can consider one or more features. In some cases, it may be desirable to select database instances that are most representative of a cluster, and so instances closest to a centroid or medoid of a cluster can be selected.

In other cases, it may be desirable to select database instances 914 based on characteristics of the database instances, including information about a client associated with a database instance. For example, some customers may have prioritized service, and so their workloads may be selected for capture to help ensure that any changes to a database instance do not negatively impact the client.

When a database instance 914 is selected for capture, the overall capture process can be carried out using a workload capture component 990. Similarly, when an instance is selected for replay, the replay process can be carried out using a replay component 992. In a particular implementation, the capture and replay components 990, 992 can include those implemented as described with respect to FIGS. 3-8 in Examples 2 and 3.

Example 5—Example Features Used in Classifying Database Instances

Unless otherwise indicated, disclosed techniques are not limited to the use of any particular features for use in clustering. However, the following discussion provides representative features that can be used for clustering. Features are generally selected such that, if two database instances have similar values for a feature, there is some similarity between the database instances in properties relevant for either workload capture or replay. For example, the similarities may be such that a change to a selected database instance, such as its software or configuration, would be expected to have a similar effect on the other database instance. In other cases, there may be less of a concern as to whether database instances may be similar in terms of replay, but rather it may be desirable to obtain a workload for one database instance that has similar feature values as another database instance, where there may be an expectation that the workload for one instance may be representative of the other.

One feature that can be used is the age of an instance. The age of the instance can be the age from the time the instance was first created, or another age, such as the age after a most recent software or configuration upgrade or update.

The length of an agreement between a client and a cloud database services provider can also be used as a feature for instance clustering. For example, it may be useful to track when a customer first contracted to use database services from a particular provider. Other contractual terms can be used as well, such as information about service level agreements.

In some cases, database operations can be correlated with the size of a database instance, where size can refer to the amount of computing resources allocated to the database instance or the amount of computing resources used by the database instance (as well as metrics such as a ratio of the allocated resources to the used resources). Size can refer to the allocation or use of resources such as processors, memory, or disk storage.

As described with respect to FIG. 9, in many cases, a single client can have multiple database instances. Accordingly, a feature that can be used for clustering is a total number of instances associated with the particular client associated with a particular instance. There are variety of use metrics that can be used as features for clustering. That is, in a similar manner as having similar resource allocations can indicate similarities between database instances, similarities between workloads can suggest similarities between database instances.

A database workload can be characterized in a variety of ways. For example, a workload can be characterized by various throughput measures, such as, over a particular time period, a number of current user sessions; statements processed; data volume (such as in bytes) that is read, written, or processed; data volume sent to clients; statements (such as SQL statements) or transactions processed; or concurrent statements or transactions processed. Databases can have standard components and specialized components, and it may be useful to track throughput with respect to particular components in addition to, or in place of, looking at metrics for the database instance/workload overall. Similarly, specific components of a database instance can perform a variety of functions, and it can be useful to track throughput or similar metrics for the use of a particular functionality.

Taking SAP HANA CLOUD instances as example of the database instances to be clustered, components whose usage can be tracked and use for clustering include the HANA Execution Engine (HEX), High Availability, Partitioning, SQL Plan Cache, Security, SDI (Smart Data Integration) or SDA (Smart Data Access), Calculation Engine, SQL Optimizer, OLAP Engine, Full Text Search, Live Cache, DocStore, MDX (for use in processing multidimensional expressions), graph database processing functionality, a SQLScript engine, processing for special queries, processing of column sore tables, and replication functionality.

As an example of particular functionality of particular components, the HANA Execution Engine can include functionality to perform operator projections, statement execution, index joins on a column, predicate disjunction operations, union all operations, window operations, distributed exchange operations (data exchange between nodes or partitions of a distributed database), searches for values within a range, predicate comparison, operator translations, monitor scan operations, internal table projections, selection operations, or to carry out other operations of the HANA execution engine.

For the High Availability component, functionality can include auto failover operations, log replay during system replication, performing system replication, or calling functionality of a storage connector.

For Partitioning, functionality can include performing range-range partitioning, hash-range partitioning, tree partitioning, range-hash partitioning, time selection, hash partitioning, or other types of partitioning operations.

For the SQL Plan Cache, operations can include automatically recompiling a candidate query plan, modifying an existing query plan for use with a new query (such as removing or modifying a WHERE clause), pinning a query plan to the cache, unpinning a query plan, removing an entry from the cache, recompiling a query plan when query execution is slower than a threshold, recompiling a query plan when query execution time is long relative to a time needed to compile the original query plan, and other operations to manage the cache or update cached query plans.

The Security component can include operations such as single sign-on operations (such as using Security Assertion Markup Language), LDAP authorization, local authorization, Open SSL authorization, key management, user creation or deletion operations, or other types of authorization or security management operations.

Operations performed by the SDI or SDA components can include the use of various adapters to facilitate operations with other database systems, processing calls to virtual tables, or more creating or modifying "subscriptions" to remote database systems (such as for use in data replication).

For the Calculation Engine, example operations include performing anonymization operations, partial query unfolding, operations involving virtual tables, requests to generate summaries or visual representation of calculation engine operations, pruning execution when a union operation fails to produce results (or indicating the success or failure of such an operation), temporal processing (for example, performing processing using a historical state of a database, rather than a current state), data conversion operations (such as currency conversions), or clustering operations (such as multi-dimensional clustering). The Calculation Engine can also perform operations in executing various "scenarios," where a scenario can include query operations, as well as processing of input or query results. For example, the Calculation Engine can perform calculations, aggregations, transformation, or predictive modelling operations, and the use of these features can be tracked and used for clustering operations.

The SQL Optimizer can perform operations such as setting an enumeration limit for plans considered during query optimization (and where this value can be checked using by a call to a setting), recording when an enumeration limit was reached during query optimization (either for an entire statement or for individual operations in a statement), or calls to perform query optimization.

For the OLAP Engine, metrics can be tracked for operations such as a number of times the OLAP Engine is called. Information about the number of time "specialized" components, such as the OLAP Engine, the Calculation Engine, or a JOIN Engine, are called can be particularly informative about the types of workloads being processed by database instances, as OLTP processing can differ significantly from OLAP processing. Replaying an OLTP heavy workload on a database instance may not identify issues that might surface if a large number of OLAP queries are encountered during productive use of a database instance that has the same software or configuration as the replay system.

Full Text Search is another specialized function that can be useful in classifying workloads, and thus clustering database instances based on their workload. As with other specialized processes, the number of times Full Text Search is used can be used in classifying database instances based on their workloads. Specific restrictions and requests for Full Text Search can also be tracked and used for classifications, such as requests to highlight matches, calling of Term Frequency-Inverse Document Frequency processing, the use of stop words, similarity (rather than exact match) analysis, or functionality related to enterprise search.

In addition to tracking a number of times the Live Cache is called/used, operations that can be tracked include cache hits or cache hits ratios, information about cache size and utilization, a number of cache evictions over a time period, or information about times taken for a cache to reach a desired performance level.

DocStore can refer to non-relational storage that can be accessed in query processing. In addition to tracking a number of times this feature is used in query processing, it can be useful to track a number of requests for DML (Data Manipulation Language) operations on items stored in the DocStore, or DDL (Data Definition Language) operations for managing collections of DocStore objects.

Operations that can be tracked for the MDX component include tracking a number of operations that involve multiple hierarchies (such having multiple hierarchies for a single dimension of multi-dimensional data or having multiple dimensions with hierarchies), calls to perform aggregation in multi-dimensional processing, the calculation of "members" (such as sums or average of dimensional values), or requests for metadata regarding with dimensions or other OLAP components.

For graph database functionality, it can be tracked how many times this functionality was called, as well as tracking operations such as requests to perform pattern matching, or graph operations received in a graph query language, a number of times built in graph algorithms are called, or processing tabular representations of graph data (such as using OpenCypher).

In addition to tracking a number of operations that use SQLScript, it can be useful to track operations that reference a default schema, SQLScript operations that include parameters, requests to perform operations with validation, operations that call Calculation Engine functions, or operations that involve asynchronous procedures.

While the above functionality is described for HANA CLOUD, similar functionality of other database systems may be tracked in an analogous manner. A given implementation of disclosed techniques need not track all of the above-described components and features, or can track components or features other than, or in addition to, those listed above. The nature of the workloads and database instances being clustered can influence the components or features to be monitored, or to be used in clustering. That is, a variety of components and features can be tracked, but different subsets of those features can be included in different clustering scenarios.

Example 6—Example Feature Useable in Instance Selection

In one sense, "features" can refer to particular components of a database system, and the degree of use of these features can be tracked and used in database instance clustering. In another sense, "features" can refer to, typically, higher-level database functionality that can be toggled on or off by, or for, particular clients.

Examples of these kinds of features include management features for pods, such as Kubernetes pods, where a given pod can host one or more containers, each potentially representing a database instance or components of a database instance. Providing global multiline log support for pods is one example of a management feature. Other management features can be security related, such as managing the use of specific service keys for brokers that may manage the interaction of services or resources in a cloud environment. Another security feature can be setting a global password expiration policy or leaving password policies to individual database instances. Features that can be toggled can also include the availability of additional database instances for high availability or failover purposes. For example, to help manage resources, it may be desirable to selectively enable high availability, failover, or disaster recovery for particular database instances. Similarly, it may be desirable to control whether particular database instances are allowed to perform "self-service" restore operations, such as from a backup stored on a data lake.

Other types of resource management that can be selectively enabled include those used for purposes such as caching, load balancing, or other techniques to secure or improve data traffic to, from, or between database instances. A service that monitors response times from database instances can be used to redirect traffic in situations where a particular database might be unreachable or have a slow connection. Features can also be enabled or disabled that relate to database performance or workload processing, such as enabling or disabling a central logging service, or a particular broker for a logging service, or for modifying a format in which log information is stored.

Example 7—Example Clustering Process

Figure 10:
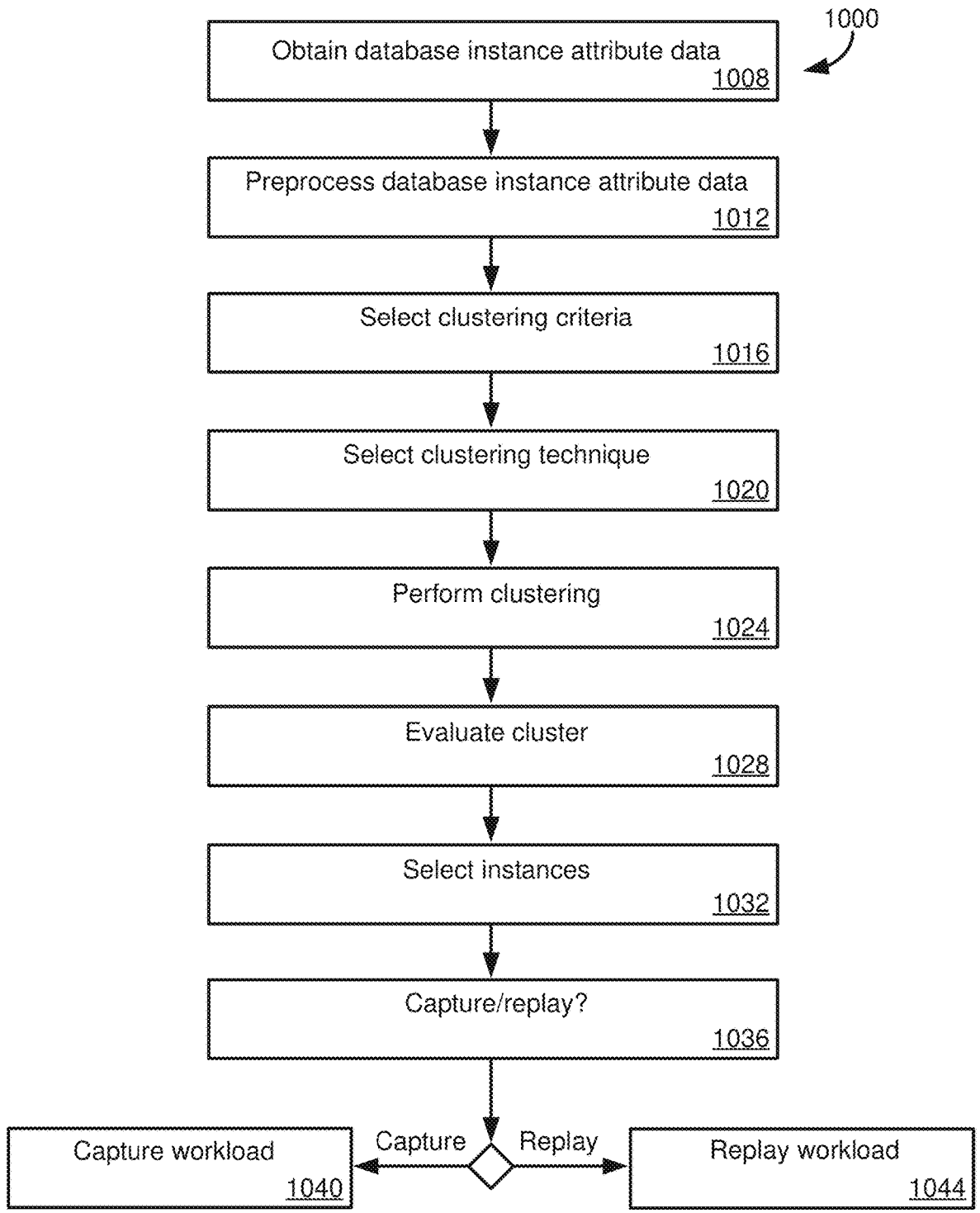
FIG. 10 is a flowchart of an example process for clustering database instances for use in workload capture or replay operations.

FIG. 10 provides a flowchart of an example process 1000 for performing clustering and database instance selection for one or both of workload capture or workload replay. Database instance attribute data is obtained at 1008. For example, the database attribute data can be obtained by, or from, the data aggregator 966 of FIG. 9. Optionally, data can be preprocessed at 1012. Data preprocessing can include operations such as handling missing values, outlier detection and handling, encoding non-numerical features (such as a product name, application type, or industry type associated with a software application with which a database instance is used) into a numerical format, or scaling numerical attributes (such as size or throughout).

Clustering criteria are selected from the attributes at 1016. This selection can be performed manually, in an automated manner, or in a semi-automated manner. Selecting features in an automated manner can include selecting attributes from a predefined selection of attributes. Automated feature selection can also include selecting features based on computer-implemented, algorithmic techniques, such as those involving the use of SHAP or LIME values, or using techniques such as principal component analysis, recursive feature elimination, correlation analysis, univariate feature selection, or techniques that have "built in" feature selection, such as k-means or hierarchical clustering. However, even though clustering techniques may implicitly perform a form of feature selection, it can be useful to limit the attributes used in a clustering algorithm. Limiting features can reduce the use of computing resources or to improve the accuracy or ease of interpretation of clustering results, including noise or dimensionality reduction.

Performing attribute selection in a semi-automated manner can include having a user manually select or confirm at least some attributes that are determined using a technique described for automated attribute selection, where the user can optionally select additional attributes, even if not identified or selected by such a technique.

A clustering technique is selected at 1020. Clustering techniques can be selected automatically or manually, including based on the nature of the attributes to be used in clustering. Selecting a clustering technique at 1020 can include having a predefined clustering technique, such as being "hardcoded" into computer code that will perform the clustering.

At 1024, clustering is performed using the selected clustering technique. Clusters can optionally be evaluated at 1028. Evaluating a cluster can include calculating metrics such as cluster cohesion, separation, or silhouette scores. If a cluster does not satisfy thresholds for one or more metrics, the process 1000 can return to 1016 or 1020, where attributes to be used for clustering or a clustering technique can be modified to determine whether improved clustering results can be obtained.

Representative database instances are selected from the clusters at 1032. Selecting a representative database instance can be performed automatically using defined criteria or can be manually performed, where manual selection can consider criteria used in automatic database instance selection. At least certain criteria can include those related to how representative a database instance is of a cluster, such as based on how close the database instance is to the centroid or medoid of the cluster. However, other criteria can be used to select database instances, such as information regarding a client associated with a database instance or other database instance attributes.

The process 1000 can be used for one or both of workload capture or workload replay. Decision 1036 determines whether the process 1000 is used for capture or replay. If the process 1000 is used for workload capture, workload capture for the selected instances can be initiated at 1040. If the process 1000 is used for workload replay, replay can be initiated at 1044. Initiating replay can include determining a scenario (such as database settings or software) that should be used during workload replay.

Note that decision 1036 need not be used in a particular implementation of the process 1000. That is, particular computing code implementing the process 1000 can specifically be for capture or replay, and so decision 1040 is not a condition that is evaluated during code execution. However, in some cases, at least certain operations of the process 1000 can be reused, or at least be common between, workload capture and workload replay operations.

Example 8—Example Operations

Figure 11A:
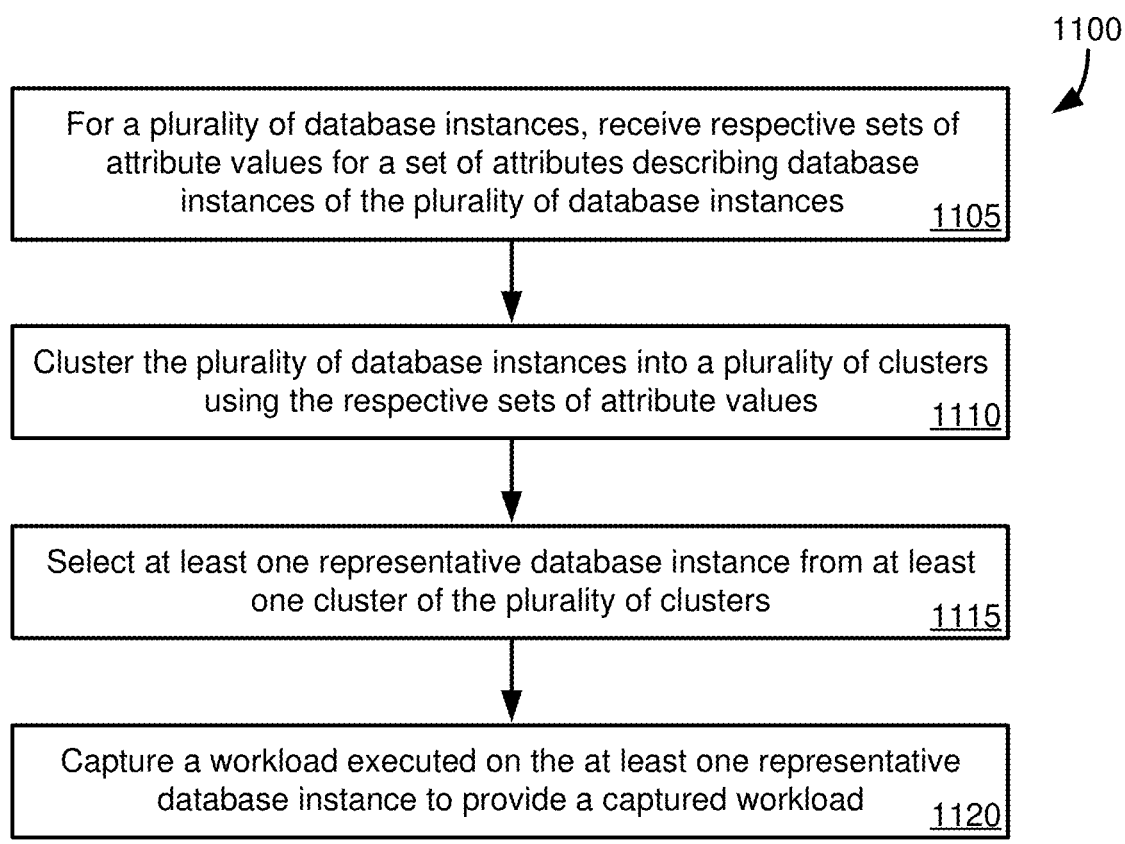
FIG. 11A is a flowchart of an example process of clustering database instances and selecting a database instance from a cluster produced thereby for database workload capture.

FIG. 11A is a flowchart of a process 1100 of clustering database instances and selecting a database instance from a cluster produced thereby for database workload capture. At 1105, for a plurality of database instances, respective sets of attribute values are received for a set of attributes describing database instances of the plurality of database instances. The plurality of database instances are clustered into a plurality of clusters using the respective sets of attribute values at 1110. At least one representative database instance is selected at 1115 from at least one cluster of the plurality of clusters. At 1120, a workload executed on the at least one representative database instance is captured to provide a captured workload.

Figure 11B:
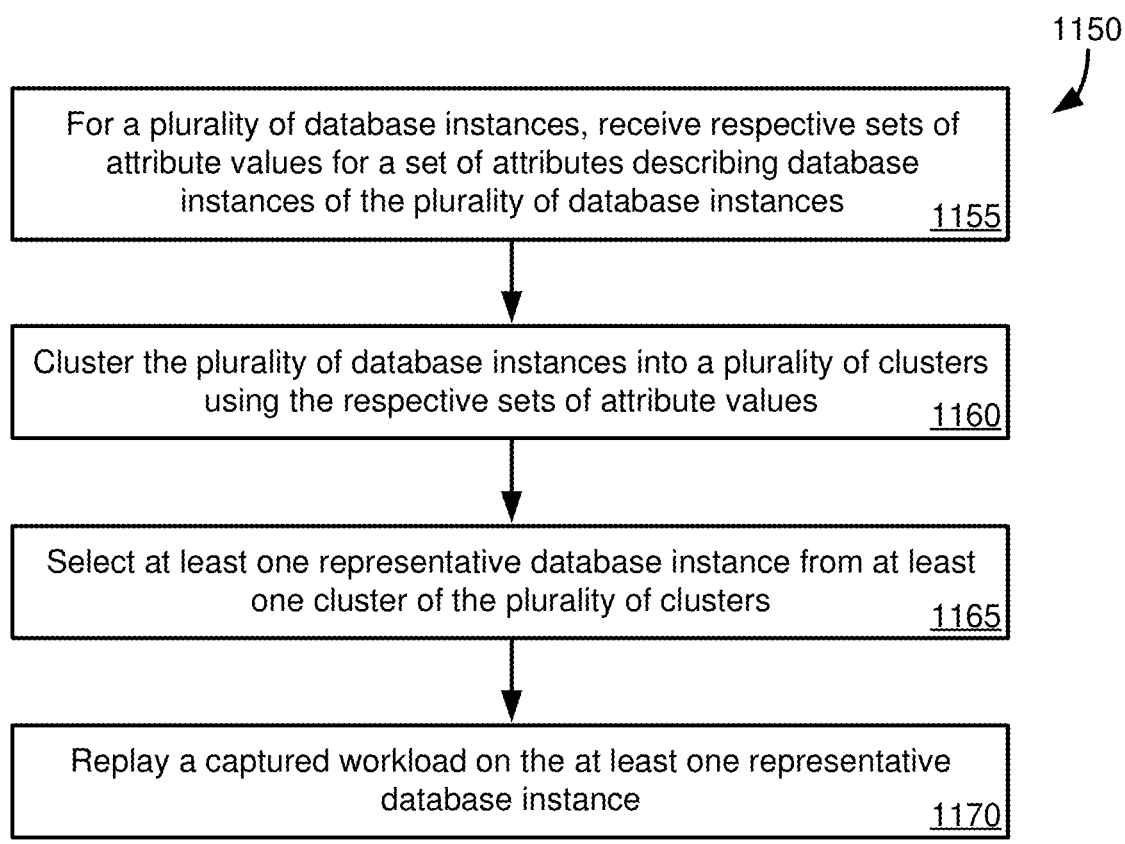
FIG. 11B is a flowchart of an example process of clustering database instances and selecting a database instance from a cluster produced thereby for database workload replay.

FIG. 11B is a flowchart of a process 1150 of clustering database instances and selecting a database instance from a cluster produced thereby for database workload replay. At 1155, for a plurality of database instances, respective sets of attribute values are received for a set of attributes describing database instances of the plurality of database instances. The plurality of database instances are clustered into a plurality of clusters using the respective sets of attribute values at 1160. At least one representative database instance is selected at 1165 from at least one cluster of the plurality of clusters. At 1170, a captured workload is replayed on the at least one representative database instance.

Example 9—Additional Examples

Example 1 includes a computing system comprising at least one hardware processor and at least one memory coupled to the at least one hardware processor. This system also includes one or more computer-readable storage media comprising computer-executable instructions that, when executed, cause the computing system to perform operations. These operations include for a plurality of database instances, receiving respective sets of attribute values for a set of attributes describing database instances of the plurality of database instances; clustering the plurality of database instances into a plurality of clusters using the respective sets of attribute values; selecting at least one representative database instance from at least one database of the plurality of clusters; and capturing a workload executed on the at least one representative database instance to provide a captured workload.

Example 2 includes the subject matter of Example 1. The operations also include replaying the captured workload on a database instance.

Example 3 includes the subject matter of any of Examples 1-2. The operations further include capturing database performance metrics while replaying the captured workload on the database instance, comparing the database performance metrics from replaying the captured workload with database performance metrics generated during capture of the workload, and rendering for display on a user interface a report comparing database performance metrics from replaying the captured workload with the database performance metrics generated during capture of the workload.

Example 4 includes the subject matter of any of Examples 1-2. The operations further include capturing database query results while replaying the captured workload on the database instance, comparing the query results from replaying the captured workload with database query results generated during capture of the workload, and rendering for display on a user interface a report comparing query results from replaying the captured workload with the query results generated during capture of the workload.

Example 5 includes the subject matter of any of Examples 1-4. The operations further include selecting the database instance from the at least one database.

Example 6 includes the subject matter of Example 5. The selection of the database instance from the at least one database is based at least in part on a set of defined criteria.

Example 7 includes the subject matter of any of Examples 1-6. The operations further include receiving values of the respective sets of attribute values from multiple components of a cloud database system.

Example 8 includes the subject matter of any of Examples 1-7. The set of attributes includes at least one attribute reflecting an amount of a computer resource assigned to a database instance.

Example 9 includes the subject matter of any of Examples 1-8. The set of attributes includes at least one attribute representing a throughput metric of workload of a database instance.

Example 10 includes the subject matter of any of Examples 1-9. The set of attributes includes at least one attribute representing a number of times a feature of a database instance is used over a time period.

Example 11 includes the subject matter of any of Examples 1-10. The set of attributes includes at least one attribute representing activation of a feature of a database instance.

Example 12 includes the subject matter of any of Examples 1-11. The set of attributes includes crash information for a database instance.

Example 13 includes the subject matter of any of Examples 1-12. The set of attributes includes at least one attribute measuring query performance for queries executed on a database instance.

Example 14 includes the subject matter of any of Examples 1-13. The set of attributes includes an identifier of a software application with which a database instance is used.

Example 15 is a method, implemented in a computing system comprising at least one memory and at least one hardware processor coupled to the at least one memory. The method includes for a plurality of database instances, receiving respective sets of attribute values for a set of attributes describing database instances of the plurality of database instances; clustering the plurality of database instances into a plurality of clusters using the respective sets of attribute values; selecting at least one representative database instance from at least one database of the plurality of clusters; and replaying a captured workload on the at least one representative database instance.

Example 16 includes the subject matter of Example 15. The method further includes capturing database performance metrics while replaying the captured workload on the at least one representative database instance; comparing the database performance metrics from replaying the captured workload with database performance metrics generated during capture of the workload; and rendering for display on a user interface a report comparing database performance metrics from replaying the captured workload with the database performance metrics generated during capture of the workload.

Example 17 includes the subject matter of Example 15 or Example 16. The method further includes capturing database query results while replaying the captured workload on the database instance; comparing the query results from replaying the captured workload with database query results generated during capture of the workload; and rendering for display on a user interface a report comparing query results from replaying the captured workload with the query results generated during capture of the workload.

Example 18 is one or more computer-readable storage media comprising computer-executable instructions that, when executed by a computing system comprising at least one hardware processor and at least one memory coupled to the at least one hardware processor, cause the computing system to, for a plurality of database instances, receive respective sets of attribute values for a set of attributes describing database instances of the plurality of database instances; computer-executable instructions that, when executed by the computing system, cause the computing system to database the plurality of database instances into a plurality of clusters using the respective sets of attribute values; select at least one representative database instance from at least one database of the plurality of clusters; and capture a workload executed on the at least one representative database instance to provide a captured workload.

Example 19 includes the subject matter of Example 18. The one or more computer-readable storage media further comprise computer-executable instructions that, when executed by the computing system, cause the computing system to replay the captured workload on a database instance.

Example 20 includes the subject matter of Example 19. The one or more computer-readable storage media further comprise computer-executable instructions that, when executed by the computing system, cause the computing system to capture database performance metrics or query execution results while replaying the captured workload on the database instance; compare the database performance metrics or query execution results from replaying the captured workload with, respectively, database performance metrics or query execution results generated during capture of the workload; and render for display on a user interface a report comparing database performance metrics or query execution results from replaying the captured workload with, respectively, the database performance metrics or query execution results generated during capture of the workload.

Example 10—Computing Systems

Figure 12:
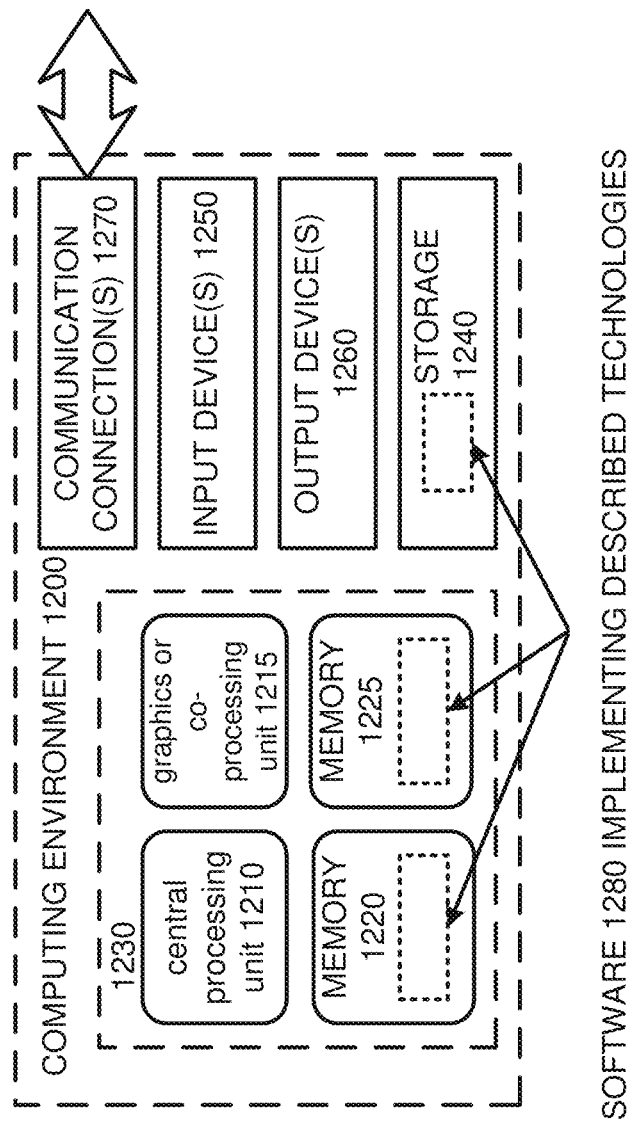
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing techniques described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215. The memory 1220, 1225, may also store database data, such as data in the row store 262 or the column store 264 of FIG. 2.

A computing system 1200 may have additional features. For example, the computing system 1200 includes storage 1240 (such as for storing persisted data 272 of FIG. 2), one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200. In some cases, the operating system can manage, or assist in managing, query language execution threads or job execution threads.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1220 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 13:
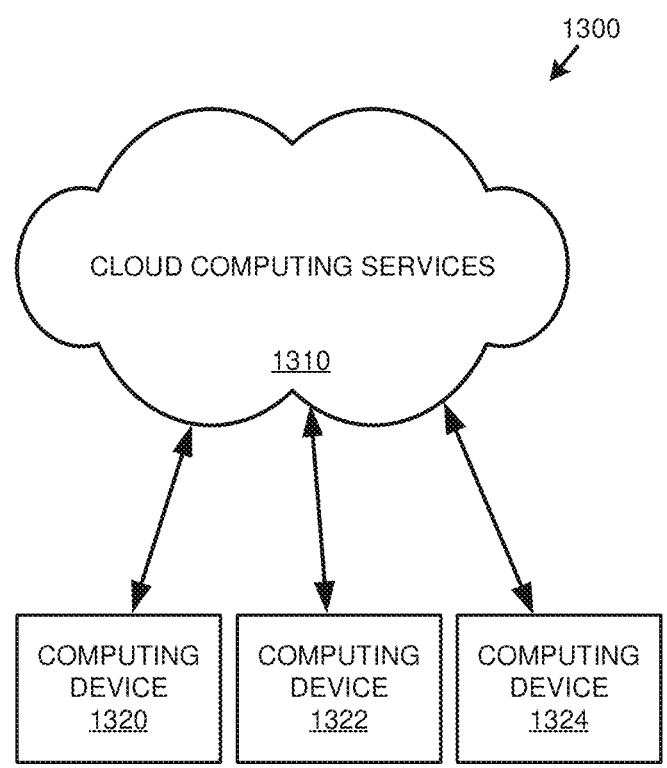
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media comprising computer-executable instructions that, when executed, cause the computing system to perform operations comprising:
for respective database instances of a plurality of database instances, receiving a respective set of attribute values for a defined set of attributes describing database instances of the plurality of database instances, wherein the defined set of attributes comprises values reflecting characteristics of database instances that are used to group the database instances into clusters for selecting representative instances to support workload capture and replay;
clustering the plurality of database instances into a plurality of clusters using the respective set of attribute values for the defined set of attributes for database instances of the plurality of database instances;
selecting at least one representative database instance from at least one cluster of the plurality of clusters using cluster definitions resulting from the clustering; and
capturing a workload executed on the at least one representative database instance, and fewer than database instances of the at least one cluster, to provide a captured workload, wherein capturing the workload comprises recording information describing database operations executed as part of the workload, the recorded information being sufficient to enable replay of the workload at another database instance of the plurality of database instances.

2. The computing system of claim 1, the operations further comprising:
replaying the captured workload on a database instance.

3. The computing system of claim 2, the operations further comprising:
capturing database performance metrics while replaying the captured workload on the database instance;
comparing the database performance metrics from replaying the captured workload with database performance metrics generated during capture of the workload; and
rendering for display on a user interface a report comparing database performance metrics from replaying the captured workload with the database performance metrics generated during capture of the workload.

4. The computing system of claim 2, the operations further comprising:
capturing database query results while replaying the captured workload on the database instance;
comparing the database query results from replaying the captured workload with database query results generated during capture of the workload; and
rendering for display on a user interface a report comparing query results from replaying the captured workload with the query results generated during capture of the workload.

5. The computing system of claim 2, the operations further comprising:
selecting the database instance, for replaying the captured workload, from the at least one cluster.

6. The computing system of claim 5, wherein the selecting the database instance from the at least one cluster is based at least part on a set of defined criteria.

7. The computing system of claim 1, the operations further comprising:
receiving values of the respective set of attribute values from multiple components of a cloud database system.

8. The computing system of claim 1, wherein the defined set of attributes comprises at least one attribute reflecting an amount of a computer resource assigned to a database instance.

9. The computing system of claim 1, wherein the defined set of attributes comprises at least one attribute representing a throughput metric of workload of a database instance.

10. The computing system of claim 1, wherein the defined set of attributes comprises at least one attribute representing a number of times a feature of a database instance is used over a time period.

11. The computing system of claim 1, wherein the defined set of attributes comprises at least one attribute representing activation of a feature of a database instance.

12. The computing system of claim 1, wherein the defined set of attributes comprises crash information for a database instance.

13. The computing system of claim 1, wherein the defined set of attributes comprises at least one attribute measuring query performance for queries executed on a database instance.

14. The computing system of claim 1, wherein the defined set of attributes comprises an identifier of a software application with which a database instance is used.

15. A method, implemented in a computing system comprising at least one memory and at least one hardware processor coupled to the at least one memory, the method comprising:
   for respective database instances of a plurality of database instances, receiving a respective set of attribute values for a defined set of attributes describing database instances of the plurality of database instances, wherein the defined set of attributes comprises values reflecting characteristics of database instances that are used to group the database instances into clusters for selecting representative instances to support workload capture and replay;
   clustering the plurality of database instances into a plurality of clusters using the respective set of attribute values for the defined set of attributes for database instances of the plurality of database instances;
   selecting at least one representative database instance from at least one cluster of the plurality of clusters using cluster definitions resulting from the clustering; and
   replaying a captured workload on the at least one representative database instance, and fewer than all database instances of the at least one cluster, wherein the captured workload comprises information describing database operations executed as part of the captured workload at another database instance of the plurality of database instances, the information being sufficient to enable replay of the captured workload at the at least one representative database instances.

16. The method of claim 15, further comprising:
   capturing database performance metrics while replaying the captured workload on the at least one representative database instance;
   comparing the database performance metrics from replaying the captured workload with database performance metrics generated during capture of the captured workload at another database instance of the plurality of database instances; and
   rendering for display on a user interface a report comparing database performance metrics from replaying the captured workload with the database performance metrics generated during capture of the captured workload at the another database instance.

17. The method of claim 15, the operations further comprising:
   capturing database query results while replaying the captured workload on the database instance;
   comparing the database query results from replaying the captured workload with database query results generated during capture of the captured workload at another database instance of the plurality of database instances; and
   rendering for display on a user interface a report comparing query results from replaying the captured workload with the query results generated during capture of the captured workload at the another database instance.

18. One or more computer-readable storage media comprising:
   computer-executable instructions that, when executed by a computing system comprising at least one hardware processor and at least one memory coupled to the at least one hardware processor, cause the computing system to, for respective database instances of a plurality of database instances, receive a respective set of attribute values for a defined set of attributes describing database instances of the plurality of database instances, wherein the defined set of attributes comprises values reflecting characteristics of database instances that are used to group the database instances into clusters for selecting representative instances to support workload capture and replay;
   computer-executable instructions that, when executed by the computing system, cause the computing system to cluster the plurality of database instances into a plurality of clusters using the respective set of attribute values for the defined set of attributes for database instances of the plurality of database instances;
   computer-executable instructions that, when executed by the computing system, cause the computing system to select at least one representative database instance from at least one cluster of the plurality of clusters using cluster definitions resulting from the clustering; and
   computer-executable instructions that, when executed by the computing system, cause the computing system to capture a workload executed on the at least one representative database instance, and fewer than database instances of the at least one cluster, to provide a captured workload, wherein capturing the workload comprises recording information describing database operations executed as part of the workload, the recorded information being sufficient to enable replay of the workload at another database instance of the plurality of database instances.

19. The one or more computer-readable storage media of claim 18, further comprising:
   computer-executable instructions that, when executed by the computing system, cause the computing system to replay the captured workload on a database instance of the plurality of database instances other than the at least one representative database instance.

20. The one or more computer-readable storage media of claim 19, further comprising:
   computer-executable instructions that, when executed by the computing system, cause the computing system to capture database performance metrics or query execution results while replaying the captured workload on the database instance;
   computer-executable instructions that, when executed by the computing system, cause the computing system to compare the database performance metrics or query execution results from replaying the captured workload with, respectively, database performance metrics or query execution results generated during capture of the workload; and
   computer-executable instructions that, when executed by the computing system, cause the computing system to render for display on a user interface a report comparing database performance metrics or query execution results from replaying the captured workload with, respectively, the database performance metrics or query execution results generated during capture of the workload.

* * * * *